United States Patent
Ogauchi et al.

(10) Patent No.: US 12,128,873 B2
(45) Date of Patent: Oct. 29, 2024

(54) POWER TRANSMISSION SYSTEM FOR HYBRID VEHICLE

(71) Applicant: Mazda Motor Corporation, Hiroshima (JP)

(72) Inventors: Yasuhiro Ogauchi, Aki-gun (JP); Shinya Kamada, Aki-gun (JP); Akihiro Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 393 days.

(21) Appl. No.: 17/592,788

(22) Filed: Feb. 4, 2022

(65) Prior Publication Data
US 2022/0297668 A1    Sep. 22, 2022

(30) Foreign Application Priority Data
Mar. 18, 2021   (JP) ................ 2021-045021

(51) Int. Cl.
*B60K 6/365* (2007.10)
*B60K 6/38* (2007.10)
(Continued)

(52) U.S. Cl.
CPC ............ *B60W 20/40* (2013.01); *B60K 6/365* (2013.01); *B60K 6/38* (2013.01); *B60K 6/54* (2013.01); *B60W 10/02* (2013.01); *B60K 2006/381* (2013.01); *B60Y 2200/92* (2013.01); *F16H 15/48* (2013.01); *F16H 57/10* (2013.01);
(Continued)

(58) Field of Classification Search
CPC ...... B60W 20/40; B60W 10/02; B60W 10/06; B60W 10/08; B60K 6/365; B60K 6/38; B60K 6/54; B60K 2006/381; B60K 6/405; B60K 6/48; B60K 6/547; B60K 2006/4825; B60K 6/387; B60Y 2200/92; F16H 15/48; F16H 57/10; F16H 2200/2007; F16H 2200/2035; F16H 2200/2038; Y02T 10/62
See application file for complete search history.

(56) References Cited

U.S. PATENT DOCUMENTS

2002/0050259 A1* 5/2002 Kojima ................ B60W 10/06 903/914
2021/0094531 A1* 4/2021 Miyamoto ............ B60W 10/02
(Continued)

FOREIGN PATENT DOCUMENTS

JP          4265567 B2    5/2009

*Primary Examiner* — Justin Holmes
(74) *Attorney, Agent, or Firm* — Alleman Hall & Tuttle LLP

(57) ABSTRACT

A power transmission system for a hybrid vehicle includes planetary gear mechanisms that couple an internal combustion engine, an electric motor, and a transmission, and has a brake that engages and disengages the internal combustion engine with and from a housing. The planetary gear mechanisms have a first rotary element, a second rotary element, a third rotary element, and a fourth rotary element. Any one of the internal combustion engine, the electric motor, and the transmission is connected to a respective one of the first rotary element, the second rotary element, and the third rotary element. The fourth rotary element is configured as an inertial member for suppressing transmission of a torque fluctuation of the internal combustion engine to the transmission side.

10 Claims, 16 Drawing Sheets

(51) Int. Cl.
*B60K 6/54* (2007.10)
*B60W 10/02* (2006.01)
*B60W 20/40* (2016.01)
*F16H 15/48* (2006.01)
*F16H 57/10* (2006.01)

(52) U.S. Cl.
CPC .............. *F16H 2200/2007* (2013.01); *F16H 2200/2035* (2013.01); *F16H 2200/2038* (2013.01)

(56) References Cited

U.S. PATENT DOCUMENTS

2021/0107485 A1* 4/2021 Tabata .................. B60W 10/06
2021/0394607 A1* 12/2021 Shim ......................... F16H 3/66

* cited by examiner

FIG. 2

|  | BR1 | BR2 |
|---|---|---|
| EV TRAVEL | ○ | × |
| ENG START | × | × |
| HEV TRAVEL | × | ○ |

POWER TRANSMISSION SYSTEM FOR HYBRID VEHICLE

TECHNICAL FIELD

The present disclosure relates to a power transmission system for a hybrid vehicle.

BACKGROUND ART

A hybrid vehicle includes, as drive sources, an engine as an internal combustion engine and a motor as an electric generator, and a power transmission system that constitutes a power transmission path through which drive power of at least one of the engine and the motor can be transmitted to a transmission and a power transmission path through which the drive power of the motor is transmitted to the engine so as to start the engine and that switches a power transmission state among the engine, the motor, and the transmission.

There is a case where the hybrid vehicle switches between EV travel (electric vehicle travel), in which the vehicle travels by driving only the motor with the engine in a stopped state, and HEV travel (hybrid vehicle travel), in which the vehicle travels by driving the motor and the engine.

A hybrid vehicle disclosed in JP4265567B2 includes, as a power transmission system, an engine-side clutch that engages and disengages the engine with and from the motor and a transmission-side clutch that engages and disengages the motor with and from the transmission, and is configured to, at the time of switching from the EV travel to the HEV travel, engage the engine-side clutch in an engaged state of the transmission-side clutch to transmit the drive power of the motor to the transmission and transmit the drive power of the motor to the engine, so as to start the engine.

SUMMARY OF THE INVENTION

Problem to be Solved by the Invention

The hybrid vehicle disclosed in JP4265567B2 engages the engine-side clutch under slip control, so as to be able to start the stopped engine while suppressing a shock. However, in the case where the engine is started while the engine-side clutch is under the slip control, energy loss occurs due to heat generation of the engine-side clutch.

To handle such a problem, it is considered to couple the engine, the motor, and the transmission by the planetary gear mechanism to allow power transmission and thereby transmit drive torque of the motor to the engine without executing the slip control of the engine-side clutch at the engine start.

In the case where the engine, the motor, and the transmission are respectively coupled to a ring gear, a carrier, and a sun gear as a plurality of rotary elements that constitute the planetary gear mechanism and a torque fluctuation occurs to at least one rotary element of the plurality of rotary elements, the torque fluctuation also occurs to the other two rotary elements.

Accordingly, in particular, the torque fluctuation, which is generated at the engine start, is transmitted to the ring gear, and the torque fluctuation, which is transmitted to the ring gear, obtains a reaction force of the carrier and is transmitted to the sun gear, to which the transmission is coupled. Then, the torque fluctuation, which is transmitted to the transmission side, is eventually transmitted to a vehicle body and gives an occupant a sense of discomfort. Thus, a power transmission system for a hybrid vehicle capable of suppressing the torque fluctuation of the internal combustion engine from being transmitted to the transmission side.

The present disclosure provides a power transmission system for a hybrid vehicle including an internal combustion engine, an electric motor, and a transmission coupled by a planetary gear mechanism and capable of suppressing a torque fluctuation of the internal combustion engine at a start of the internal combustion engine from being transmitted to the transmission side while suppressing energy loss by slip control at the start during EV travel.

Means for Solving the Problem

The present disclosure provides a power transmission system for a hybrid vehicle including a planetary gear mechanism that couples an internal combustion engine, an electric motor, and a transmission in a manner to allow power transmission, the power transmission system for a hybrid vehicle having a brake that engages and disengages the internal combustion engine with and from a housing, in which the planetary gear mechanism has a first rotary element, a second rotary element, a third rotary element, and a fourth rotary element, any of the internal combustion engine, the electric motor, and the transmission is connected to respective one of the first rotary element, the second rotary element, and the third rotary element, and the fourth rotary element is configured as an inertial member for suppressing transmission of a torque fluctuation of the internal combustion engine at a start thereof to the transmission side.

According to the present disclosure, since the fourth rotary element is configured as the inertial member for suppressing the transmission of the torque fluctuation of the internal combustion engine to the transmission side, it is possible to suppress a torque fluctuation of the rotary element, which is generated by the torque fluctuation of the internal combustion engine, to the transmission.

More specifically, for example, a rotational direction of the internal combustion engine is set as a positive direction, the transmission is coupled to the first rotary element, the electric motor is coupled to the second rotary element, and the internal combustion engine is coupled to the third rotary element. In such a case, when the torque fluctuation in the positive direction is input to the third rotary element due to the torque fluctuation of the internal combustion engine at the start, this torque fluctuation obtains a reaction force of the second rotary element and attempts to fluctuate torque of the first rotary element in a negative direction. However, since the fourth rotary element functions as the inertial member for suppressing a rotational fluctuation of the first rotary element, it is possible to suppress the transmission of the torque fluctuation of the internal combustion engine to the transmission side.

In addition, the internal combustion engine, the electric motor, and the transmission are coupled by the constantly meshing planetary gear mechanism. Thus, for example, at the time of switching from electric vehicle (EV) travel to hybrid vehicle (HEV) travel in which the internal combustion engine and the electric motor are used as drive sources, the brake is disengaged to start the internal combustion engine. As a result, it is possible to transmit drive power of the electric motor to the internal combustion engine and thereby start the internal combustion engine simply by disengaging the brake without executing slip control of the brake.

In this way, compared to a case where the internal combustion engine and the electric motor with a difference in rotation are engaged under the slip control as in a power transmission system including a clutch that engages and disengages the internal combustion engine with and from the electric motor, energy loss of the drive power of the electric motor is suppressed.

On a speed chart that geometrically represents rotational speeds of the rotary elements, speed axes that represent the rotary elements and extend vertically may be aligned along a horizontal axis from one end toward another end at intervals corresponding to a gear tooth ratio of the planetary gear mechanism and may be set as the first rotary element, the second rotary element, and the third rotary element in this order from the one end, and the rotary element that is arranged on the one side of the first rotary element or on the other side of the third rotary element may be configured as the fourth rotary element.

According to this configuration, since the fourth rotary element is arranged on the one side of the first rotary element or on the other side of the third rotary element on the speed chart (in other words, is the first or last rotary element on the speed chart), it is possible to suppress the transmission of the torque fluctuation, which is input to one of the first rotary element or the third rotary element, to the other.

As described above, for example, the rotational direction of the internal combustion engine is set as the positive direction, the transmission is coupled to the first rotary element, the electric motor is coupled to the second rotary element, and the internal combustion engine is coupled to the third rotary element. In such a case, when the torque fluctuation in the positive direction is input to the third rotary element due to the torque fluctuation of the internal combustion engine at the start, the torque fluctuation, which is input to the third rotary element, obtains the reaction force corresponding to inertial mass of the second rotary element and attempts to fluctuate torque of the first rotary element in the negative direction. However, since the fourth rotary element, which has specified inertial mass, is arranged on the one side of the first rotary element, the torque fluctuation of the first rotary element in the negative direction is suppressed.

For example, it is possible to suppress a rotational fluctuation of the fourth rotary element by applying the inertial mass, which is balanced with the inertial mass of the second rotary element and the electric motor coupled to the second rotary element, to the fourth rotary element. In this way, a rotational fluctuation of the first rotary element is suppressed by the fourth rotary element, which is arranged on the one side of the first rotary element, and the second rotary element, which is arranged on the other side of the first rotary element.

The planetary gear mechanism may include a first planetary gear set and a second planetary gear set each having three rotary elements, and two rotary elements of the three rotary elements constituting the first planetary gear mechanism may be coupled to two rotary elements of the three rotary elements constituting the second planetary gear mechanism to thereby constitute two of the first rotary element, the second rotary element, and the third rotary element.

According to this configuration, the above effect can be obtained with a simple structure that only combines the first planetary gear mechanism and the second planetary gear mechanism.

It may be configured to engage the brake during EV travel in which only the electric motor is used as a drive source, and to disengage the brake and thereby start the internal combustion engine at the time of switching from the EV travel to HEV travel in which the internal combustion engine and the electric motor are used as drive sources.

According to this configuration, since the internal combustion engine, the electric motor, and the transmission are coupled to the constantly meshing planetary gear mechanism, it is possible to transmit drive power of the electric motor to the internal combustion engine and start the internal combustion engine simply by disengaging the brake without executing the slip control of the brake.

Compared to the case where the internal combustion engine and the electric motor with a difference in rotation are engaged under the slip control as in the power transmission system that includes the clutch for engaging and disengaging the internal combustion engine with and from the electric motor, the energy loss of the drive power of the electric motor is suppressed.

A clutch may be further provided, the clutch being engaged during the HEV travel and engaging and disengaging any two rotary elements of the first through fourth rotary elements.

According to this configuration, due to such a characteristic that the rotary elements of the planetary gear mechanism are aligned in a linear line on the speed chart, when any two rotary elements of the first through fourth rotary elements are engaged, the rotational speeds of the first through fourth rotary elements match. As a result, it is possible to make the HEV travel in a directly coupled state where the rotation of the internal combustion engine, the rotation of the electric motor, and the rotation of the transmission, which are coupled to the first through fourth rotary elements match.

An inertia brake may further be provided, the inertia brake being engaged during the HEV travel and differing from the brake that engages and disengages the fourth rotary element with and from the housing.

According to this configuration, since the rotational speed can vary between the internal combustion engine and the transmission during the HEV travel, it is possible to accelerate or decelerate the rotation of the internal combustion engine and transmit the accelerated or decelerated rotation to the transmission side in consideration of efficiency of the internal combustion engine and the transmission.

The first rotary element may include a sun gear of the planetary gear mechanism and may be connected with the transmission, the second rotary element may include a carrier of the planetary gear mechanism and may be connected with the electric motor, and the third rotary element may include a ring gear of the planetary gear mechanism and may be connected with the internal combustion engine.

According to this configuration, since the rotation of the electric motor that is input to the carrier is decelerated by the ring gear and is then transmitted to the internal combustion engine, it is easier to obtain torque for starting the internal combustion engine than a case where the internal combustion engine is connected to the sun gear.

An inertial mass of the inertial member may be set based on an electric motor inertial mass being the inertial mass of the electric motor, a first gear ratio being a ratio of a number of teeth of the rotary element which is connected to the internal combustion engine, to a number of teeth of the rotary element which is connected to the transmission, of the first through third rotary elements, and a second gear ratio being a ratio of a number of teeth of the rotary element which is connected to the electric motor, of the first through third rotary elements, to a rotational speed of the fourth rotary element.

According to this configuration, since the inertial mass can be set by the number of teeth of each of the first through fourth rotary elements and the electric motor inertial mass, it is possible to further effectively suppress the torque fluctuation of the internal combustion engine.

The inertial mass of the inertial member and the second gear ratio may be set to be balanced with a relationship between the electric motor inertial mass and the first gear ratio.

According to this configuration, since the inertial mass of the inertial member and the second gear ratio are set to be balanced with the relationship between the electric motor inertial mass and the first gear ratio, which contributes to the transmission of the torque fluctuation of the internal combustion engine to the transmission side, it is possible to further effectively suppress the torque fluctuation of the internal combustion engine.

When the electric motor inertial mass is set as Im, the inertial mass of the inertial member is set as Ii, the first gear ratio is set as $\lambda 1$, and the second gear ratio is set as $\lambda 2$, the following formula may be satisfied:

$$\lambda 1 \cdot Im = 1/\lambda 2(1/\lambda 2 - (1+\lambda 1)) \cdot Ii.$$

According to this configuration, since the inertial mass of the inertial member and the second gear ratio are set to satisfy the formula for setting the inertial mass of the inertial member and the second gear ratio to be balanced with the relationship between the electric motor inertial mass and the first gear ratio, which contributes to the transmission of the torque fluctuation of the internal combustion engine to the transmission side, it is possible to further effectively suppress the torque fluctuation of the internal combustion engine.

When the electric motor inertial mass is set as Im, the inertial mass of the inertial member is set as Ii, the first gear ratio is set as $\lambda 1$, and the second gear ratio is set as $\lambda 2$, the following formula may be satisfied:

$$\lambda 1 \cdot Im = 1/\lambda 2(1/\lambda 2 + (1+\lambda 1)) \cdot Ii.$$

According to this configuration, since the inertial mass of the inertial member and the second gear ratio are set to satisfy the formula for setting the inertial mass of the inertial member and the second gear ratio to be balanced with the relationship between the electric motor inertial mass and the first gear ratio, which contributes to the transmission of the torque fluctuation of the internal combustion engine to the transmission side, it is possible to further effectively suppress the torque fluctuation of the internal combustion engine.

Advantage of the Invention

According to the power transmission system for a hybrid vehicle in the present disclosure, it is possible to suppress the transmission of the torque fluctuation of the internal combustion engine at the start of the internal combustion engine during the EV travel to the transmission side while suppressing the energy loss that is caused by the slip control at the start of the internal combustion engine.

BRIEF DESCRIPTION OF THE DRAWINGS

FIG. 2 is an engagement table of the power transmission system.

MODES FOR CARRYING OUT THE INVENTION

A description will hereinafter be made on an embodiment of the present invention with reference to the accompanying drawings.

Figure 1:
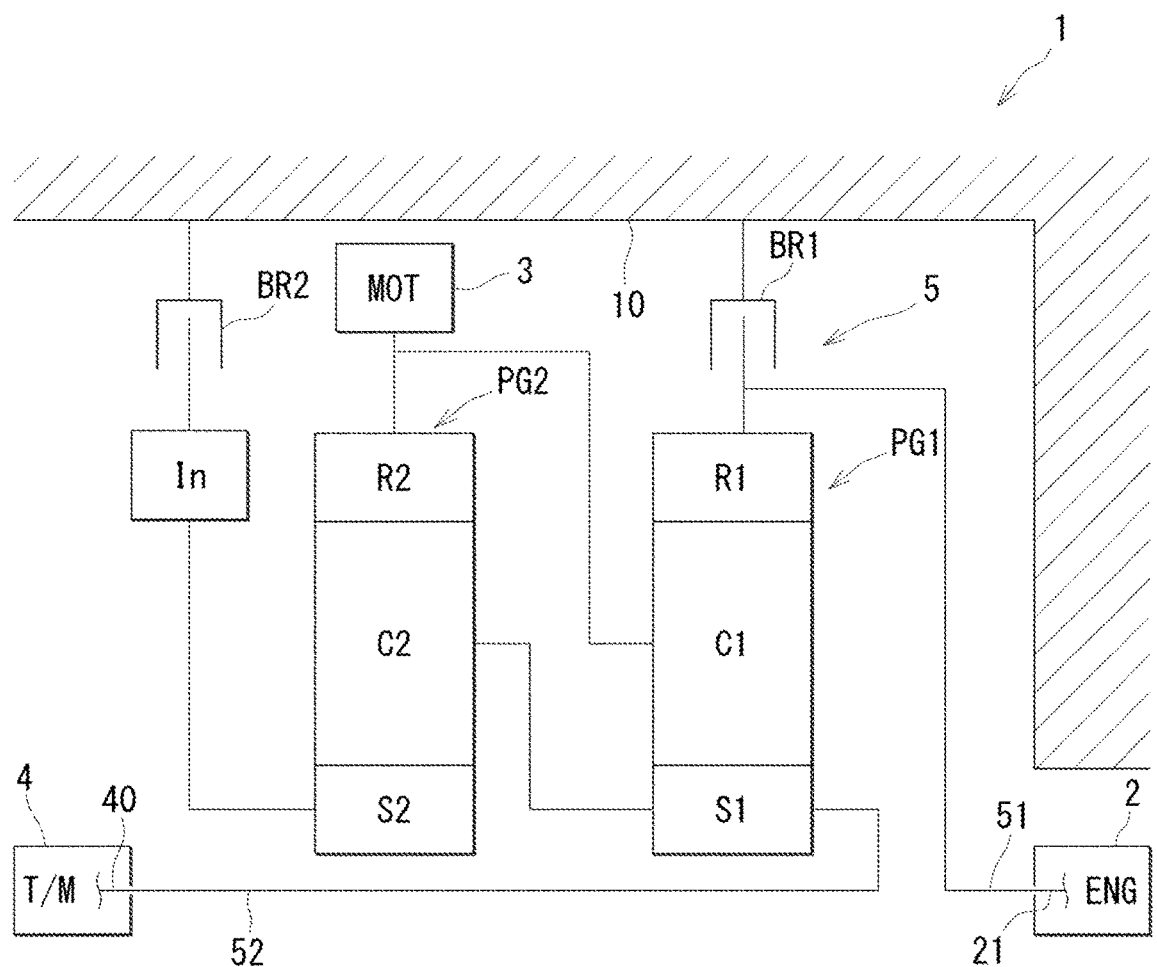
FIG. 1 is a schematic diagram of a power transmission system for a hybrid vehicle according to an embodiment of the present invention.

FIG. 1 is a schematic diagram of a power transmission system for a hybrid vehicle according to the embodiment of the present disclosure. As illustrated in FIG. 1, a hybrid vehicle 1 including a power transmission system 5 according to the embodiment of the present invention includes an engine 2 as an internal combustion engine, an automatic transmission 4 that is coupled to the engine 2 as an internal combustion engine without interposing a hydraulic power transmission such as a torque converter therebetween, and a motor 3 as an electric motor that is arranged between the engine 2 and the automatic transmission 4.

In the hybrid vehicle 1, drive wheels are driven by at least one of the engine 2 and the motor 3 as drive sources via the automatic transmission 4. Although not limited to this, the engine 2 is an in-line four-cylinder engine in which four cylinders are arranged in series, and two torque fluctuations occur during one rotation of a crankshaft that is an output shaft 21 of the engine 2.

The power transmission system 5, in which the engine 2, the motor 3, and the automatic transmission 4 are coupled to be able to transmit power, is arranged between the engine 2 and the automatic transmission 4.

The power transmission system 5 according to this embodiment has, in a transmission case 10 as a housing an input shaft 51 that is connected to the engine 2 and is disposed on a drive source side (a right side in the drawing), an output shaft 52 that is disposed in parallel with the input shaft 51 and on an opposite drive source side (a left side in the drawing) and is connected to the automatic transmission 4, and planetary gear mechanisms and brakes BR1, BR2 that are disposed on an axis of the input shaft 51 and the output shaft 52. The planetary gear mechanism include a first planetary gear set (a first gear set) PG1 and a second planetary gear set (a second gear set) PG2 that are disposed in this order from the drive source side.

The brakes are a first brake BR1 that engages and disengages the engine 2 with and from the transmission case 10 and a second brake BR2 as an inertia brake that engages and disengages an inertial member In, which will be described below, with and from the transmission case 10. In the transmission case 10, the first brake BR1 is disposed on a radially outer side of the first gear set PG1, and the second brake BR2 is disposed on the opposite drive source side of the second gear set PG2. The motor 3 is disposed on a radially outer side of the second gear set PG2.

Each of the first and second gear sets PG1, PG2 is of a single-pinion type in which a pinion supported by a carrier directly meshes with a sun gear and a ring gear. The first and second gear sets PG1, PG2 have sun gears S1, S2, ring gears R1, R2, and carriers C1, C2 as rotary elements, respectively.

In the power transmission system 5, the sun gear S1 of the first gear set PG1 is constantly coupled to the carrier C2 of the second gear set PG2, and the carrier C1 of the first gear set PG1 is constantly coupled to the ring gear R2 of the second gear set PG2.

The input shaft 51 is constantly coupled to the ring gear R1 of the first gear set PG1, and the output shaft 52 is constantly coupled to the sun gear S1 of the first gear set PG1 and the carrier C2 of the second gear set PG2.

The first brake BR1 is disposed between the transmission case 10 and a portion including the input shaft 51 and the ring gear R1 of the first gear set PG1 to engage and disengage these. The second brake BR2 is disposed between the transmission case 10 and the sun gear S2 of the second gear set PG2 to engage and disengage these.

The planetary gear mechanisms PG1, PG2 have a first rotary element X1 including the sun gear S1 of the first gear set PG1 and the carrier C2 of the second gear set PG2, a second rotary element X2 including the carrier C1 of the first gear set PG1 and the ring gear R2 of the second gear set PG2, a third rotary element X3 including the ring gear R1 of the first gear set PG1, and a fourth rotary element X4 including the sun gear S2 of the second gear set PG2.

The automatic transmission 4 is connected to the first rotary element X1 via the output shaft 52, the motor 3 is connected to the second rotary element X2, the engine 2 is connected to the third rotary element X3 via the first brake BR1, the input shaft 51, and a damper device 6, which will be described below, and the second brake BR2 is connected to the fourth rotary element X4.

Figure 2:
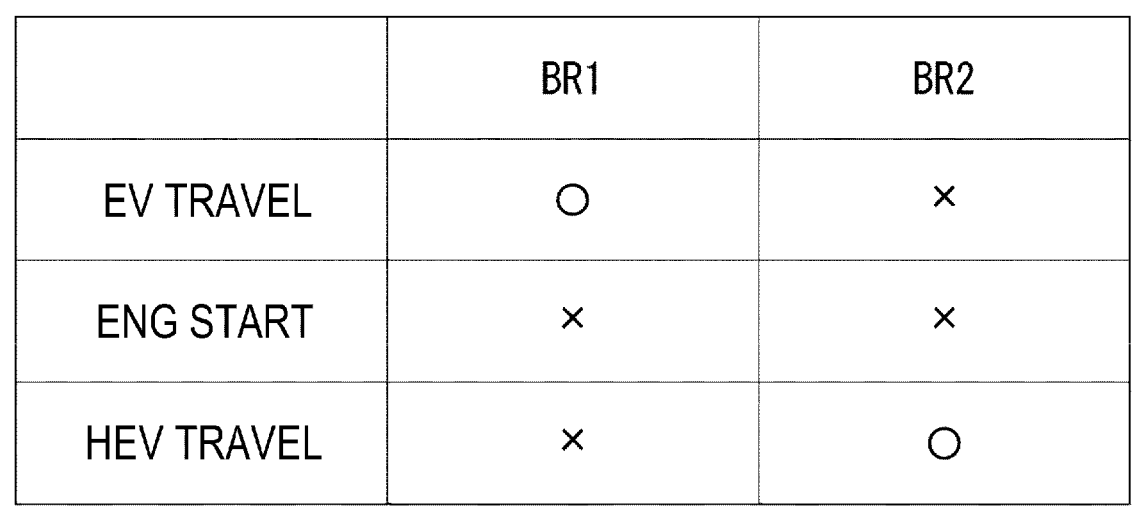

By the configuration described so far, as illustrated in FIG. 2, the power transmission system 5 can select among electric vehicle (EV) travel in which the vehicle travels only with the motor 3, an engine start in which the engine 2 is started during the EV travel, and hybrid vehicle (HEV) travel in which the vehicle travels with the motor 3 and the engine 2 according to a combination of engagement states of the first brake BR1 and the second brake BR2. In FIG. 2, an engaged state is indicated by a circle mark, and a disengaged state is indicated by a cross mark.

More specifically, during the EV travel (electric vehicle travel) in which only the motor 3 is used as the drive source, the first brake BR1 is engaged to fix the ring gear R1 of the first gear set PG1 and the engine 2 that are coupled to the first brake BR1. Drive power of the motor 3 is input to the carrier C1 of the first gear set PG1 and the ring gear R2 of the second gear set PG2. A power transmission path for the EV travel is configured that the drive power, which has been input to the carrier C1 of the first gear set PG1, receives a reaction force of the ring gear R1 and is transmitted from the sun gear S1 to the automatic transmission 4 via the output shaft 52 and that the drive power of the motor 3, which has been input to the ring gear R2 of the second gear set PG2, is transmitted from the carrier C2 to the automatic transmission 4 via the sun gear S1 of the first gear set PG1 and the output shaft 52. Since the second brake BR2 is disengaged during the EV travel, the sun gear S2 of the second gear set PG2 rotates at a rotational speed that is determined by rotation of the ring gear R2 and the carrier C2.

A power transmission path for the engine start is configured that, at the time of switching from the EV travel to the HEV travel (hybrid travel) in which the engine 2 and the motor 3 are used as the drive sources, the first brake BR1 is disengaged and the drive power of the motor 3, which has been input to the carrier C1 of the first gear set PG1, is transmitted to the engine 2 via the ring gear R1 so as to start the engine 2.

During the HEV travel after the engine start, in addition to the power transmission path for the EV travel, a power transmission path is configured to engage the second brake BR2 in a disengaged state of the first brake BR1 so as to input drive power of the engine 2 to the ring gear R1 of the first gear set PG1 and to transmit the drive power of the engine 2 to the automatic transmission 4 via the sun gear S1 and the output shaft 52.

Figure 3:
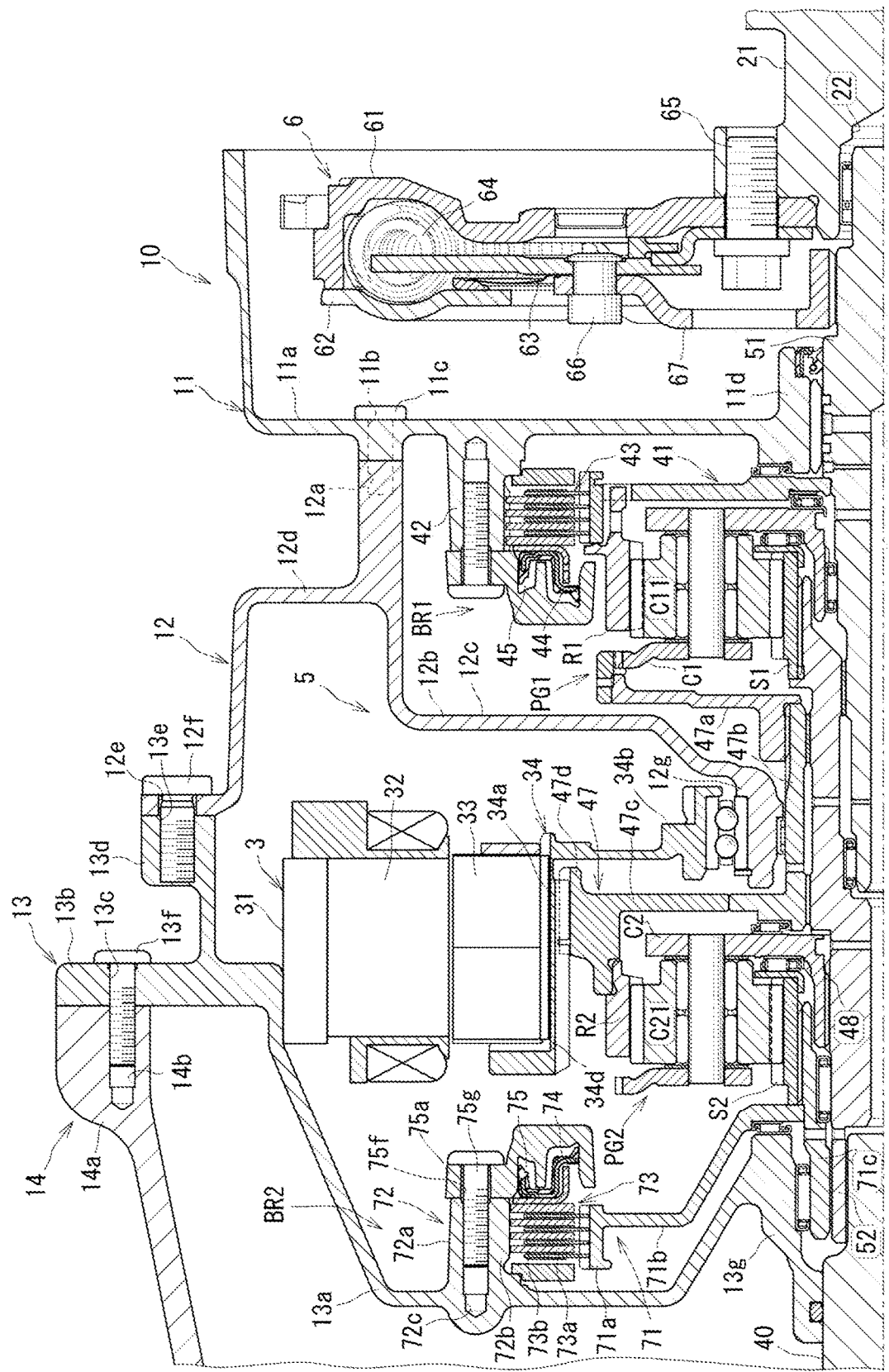
FIG. 3 is a cross-sectional view of the power transmission system and surroundings thereof.

FIG. 3 is a cross-sectional view of the power transmission system 5 and surroundings thereof. As illustrated in FIG. 3, in this embodiment, the damper device 6 is coupled to the output shaft 21 of the engine 2 so as to absorb the torque fluctuation of the engine 2. The damper device 6 is arranged on the same axis as the output shaft 21 and is fixedly attached thereto.

The motor 3, the automatic transmission 4, the power transmission system 5, and the damper device 6 are accommodated in the transmission case 10 that is formed in a substantially cylindrical shape.

The transmission case 10 has a cylindrical first case member 11 that accommodates the damper device 6, a second case member 12 and a third case member 13 that have a cylindrical shape and accommodate the power transmission system 5 and the motor 3, and a cylindrical fourth case member 14 that accommodates the automatic transmission 4.

The second case member 12 accommodates the first gear set PG1 and the first brake BR1, which constitute the power transmission system 5, and the third case member 13 accommodates the second gear set PG2 and the second brake BR2, which constitute the motor 3 and the power transmission system 5.

In an end portion on the opposite drive source side of the first case member 11, a first vertical wall section 11a is provided to extend radially and close the drive source side of the second case member 12. In a portion on a radially outer side of the first vertical wall section 11a, a through hole 11b is provided to pass therethrough in an axial direction. The first case member 11 is fixed to a cylinder block, which is not illustrated, of the engine 2.

In an end portion on the drive source side of the second case member 12, a screw hole 12a is provided to extend in the axial direction and fix the first case member 11 by a bolt 11c. The first case member 11 and the second case member 12 are coupled to each other by causing the bolt 11c to pass through the through hole 11b from the drive source side of the first vertical wall section 11a and to be screwed into the screw hole 12a.

On the opposite drive source side of the second case member 12, a second vertical wall section 12b is provided to extend radially and close the drive source side of the third case member 13. The second vertical wall section 12b includes a second inner vertical wall section 12c that extends to a radially inner side of a coupled section with the first case member 11 and a second outer vertical wall section 12d that is arranged on a radially outer side of the coupled section with the first case member 11 and extends radially. In an end portion on the opposite drive source side of the second outer vertical wall section 12d, a through hole 12e is provided to pass therethrough in the axial direction.

On the opposite drive source side of the third case member 13, a third vertical wall section 13a and a fixed section 13b are provided. The third vertical wall section 13a is disposed on a radially inner side, extends radially, and closes the drive source side of the fourth case member 14. The fixed section 13b is arranged on a radially outer side, extends radially, and is used to couple the third case member 13 and the fourth case member 14. The fixed section 13b is provided with a through hole 13c that passes therethrough in the axial direction.

In an end portion on the drive source side of the third case member 13, a projected section 13d is provided. The projected section 13d is projected radially outward, is provided at a position corresponding to the through hole 12e of the second case member 12, and has a screw hole 13e therein. The second case member 12 and the third case member 13 are coupled to each other by causing a bolt 12f to pass through the through hole 12e from the drive source side of the second outer vertical wall section 12d and to be screwed into the screw hole 13e.

In an end portion on the drive source side of the fourth case member 14, a projected section 14a is provided. The projected section 14a is projected radially outward, is provided at a position corresponding to the through hole 13c of the third case member 13, and has a screw hole 14b therein. The third case member 13 and the fourth case member 14 are coupled to each other by causing a bolt 13f to pass through the through hole 13c from the drive source side and to be screwed into the screw hole 14b.

The damper device 6 is interposed between the engine 2 and the power transmission system 5 in order to suppress vibration caused by the torque fluctuation of the engine 2 and has a drive plate 61 to which the power from the engine 2 is input, a holding plate 62 that is arranged on the opposite drive source side of the drive plate 61 and is fixed to the drive plate 61, and a driven plate 63 that is arranged between the drive plate 61 and the holding plate 62.

The drive plate 61 and the driven plate 63 are provided in a relatively rotatable manner and are coupled to each other in a rotationally transmittable manner via coil springs 64 as elastic members that are arranged along a circumferential direction at plural circumferential positions between the drive plate 61 and the holding plate 62.

The drive plate 61 is arranged on the drive source side, is fixed to the crankshaft 21 by using a fastening bolt 65, and extends radially. A coupling plate 67 is attached to the driven plate 63 by a rivet 66. The coupling plate 67 is arranged on the opposite drive source side of the drive plate 61, and a radially inner end portion thereof is spline-fitted and coupled to the input shaft 51 of the power transmission system 5.

The damper device 6 suppresses the torque fluctuation of the engine 2 by compression of the coil spring 64 when the power from the engine 2 is transmitted from the drive plate 61 to the driven plate 63 via the coil spring 64. The damper device 6 transmits the power from the engine 2 to the input shaft 51 of the power transmission system 5 via the drive plate 61, the coil spring 64, the driven plate 63, and the coupling plate 67.

The motor 3 has a stator 32 that is fixed to a motor housing 31 joined to the transmission case 10 and a rotor 33 that is supported by a rotor support member 34 joined to the output shaft 52 of the power transmission system 5 and is arranged on a radially inner side of the stator 32. The stator 32 is configured by winding a coil around a stator core that is formed of a magnetic body. The rotor 33 includes a cylindrical magnetic body. In the motor 3, when electric power is supplied to the stator 32, the rotor 33 rotates by a magnetic force generated to the stator 32.

The automatic transmission 4 includes an input shaft 40 that is rotatably supported by the transmission case 10. Although not illustrated, the automatic transmission 4 includes a transmission mechanism that has a plurality of planetary gear sets (planetary gear mechanisms) and a plurality of frictional engagement elements such as clutches and brakes, and an output shaft. The transmission mechanism is configured to switch the power transmission path that runs through the planetary gear sets by selectively engaging the plurality of friction engagement elements and thereby achieve a specified gear stage corresponding to a drive state of the vehicle.

The automatic transmission 4 is configured to form the power transmission path, through which the power is transmitted from the engine 2 and the motor 3 to the drive wheels 3, selectively switch the power transmission path that runs through the planetary gear mechanisms by selectively engaging the plurality of friction engagement elements, and thereby achieve the gear stage corresponding to the drive state of the vehicle.

The input shaft 51 of the power transmission system 5 passes through the first vertical wall section 11a of the first case member 11 and is rotatably supported by, via a bearing, a first axial section 11d that extends axially from an inner end portion of the first vertical wall section 11a.

An end portion on the drive source side of the input shaft 51 is rotatably supported via a bearing by a boss section 22 that is provided in an end portion on the opposite drive source side of the output shaft 21 of the engine 2. An end portion on the opposite drive source side of the input shaft 51 extends to a position where an axial position thereof overlaps a second axial section 12g that extends axially from an inner end portion of the second inner vertical wall section 12c of the second case member 12.

The output shaft 52 of the power transmission system 5 is arranged on an outer circumference side of the input shaft 51 and is rotatably supported by the input shaft 51 via a bearing. The sun gear S1 of the first gear set PG1 is spline-fitted to the outer circumferential side of an end portion on the drive source side of the output shaft 52 of the power transmission system 5.

An end portion on the opposite drive source side of the output shaft 52 extends to a position where an axial position thereof overlaps a third axial section 13g that extends axially from an inner end portion of the third case member 13. The input shaft 40 of the automatic transmission 4 is spline-fitted to an inner circumferential side of the output shaft 52. Axial positions of the input shaft 51 and the output shaft 52 of the power transmission system 5 overlap each other on an inner circumferential side of the second case member 12.

A description will be made on configurations of the first brake BR1 and the first gear set PG1 with reference to FIG. 4 to FIG. 9.

Figure 4:
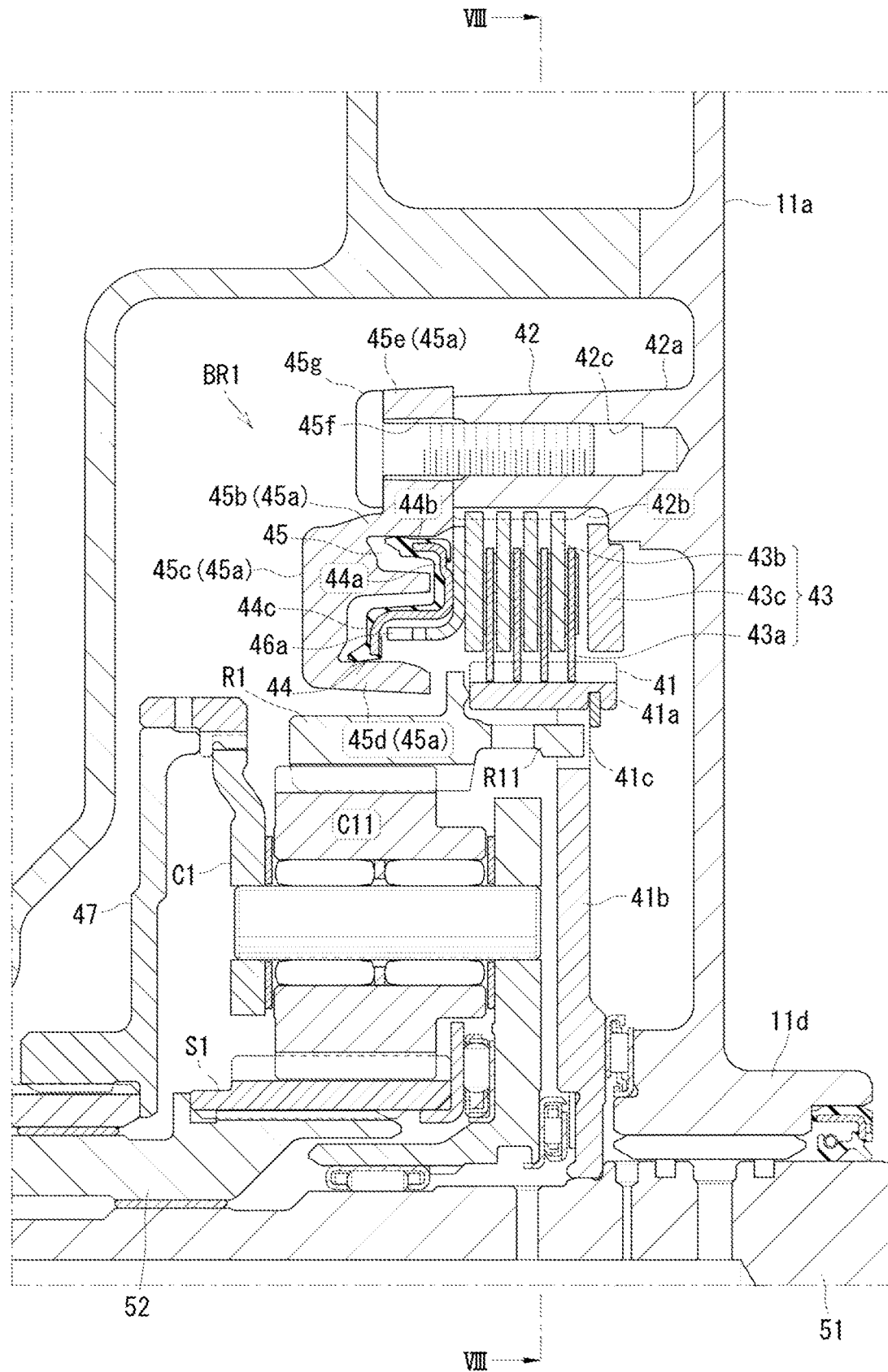
FIG. 4 is an enlarged cross-sectional view of the power transmission system and the surroundings thereof.

As illustrated in FIG. 4, the first brake BR1 has a hub member 41 that is joined to the ring gear R1 of the first gear set PG1, a drum member 42 that is provided in a manner to be projected to the opposite drive source side from the transmission case 10, in detail, the first vertical wall section 11a of the first case member 11, a plurality of friction plates 43 that are arranged between the hub member 41 and the drum member 42, a plurality friction plates 43 that are alternately spline-fitted to the hub member 41 and the drum member 42, a piston 44 that is arranged on the opposite drive source side of the plurality of friction plates 43, a hydraulic chamber 45 that is provided on the opposite drive source side of the piston 44, and a return spring 46.

In the first brake BR1, when an engagement hydraulic pressure is supplied to the hydraulic chamber 45, the piston 44 moves to the drive source side in an engagement direction, presses the plurality of friction plates 43, and joins the hub member 41 and the drum member 42. In this way, the first brake BR1 is engaged.

In addition, in the first brake BR1, when the engagement hydraulic pressure is discharged from the hydraulic chamber 45, the piston 44 moves to the opposite drive source side in a disengagement direction by the return spring 46 and cancels joint between the hub member 41 and the drum member 42. In this way, the first brake BR1 is disengaged.

The hub member 41 includes an inner cylindrical section 41a to which the friction plate 43 is spline-fitted and a disk section 41b that extends radially inward along the first vertical wall section 11a of the first case member 11 from an end portion on the drive source side of the inner cylindrical section 41a. An inner end portion of the disk section 41b is fixedly joined to an outer circumferential surface of the input shaft 51 of the power transmission system 5 by welding or the like. In this way, the power input to the input shaft 51 is transmitted to the hub member 41. The disk section 41b is rotatably supported by the first vertical wall section 11a via a bearing that is arranged between a surface on the drive source side of the disk section 41b and a surface on the opposite drive source side of the first vertical wall section 11a.

The ring gear R1 of the first gear set PG1 is joined to an end portion on the opposite drive source side of the inner cylindrical section 41a by welding or the like and is thereby fixed thereto. In a portion on a radially outer side of the disk section 41b, a comb tooth section 41c is provided and formed by notching an outer circumferential end portion at a plurality of positions in the circumferential direction. A comb tooth section R11 that is formed by notching an end portion on the drive source side of the ring gear R1 at the plurality of positions in the circumferential direction is engaged with the comb tooth section 41c. This allows the input shaft 51, the hub member 41, and the ring gear R1 to rotate integrally.

Figure 8:
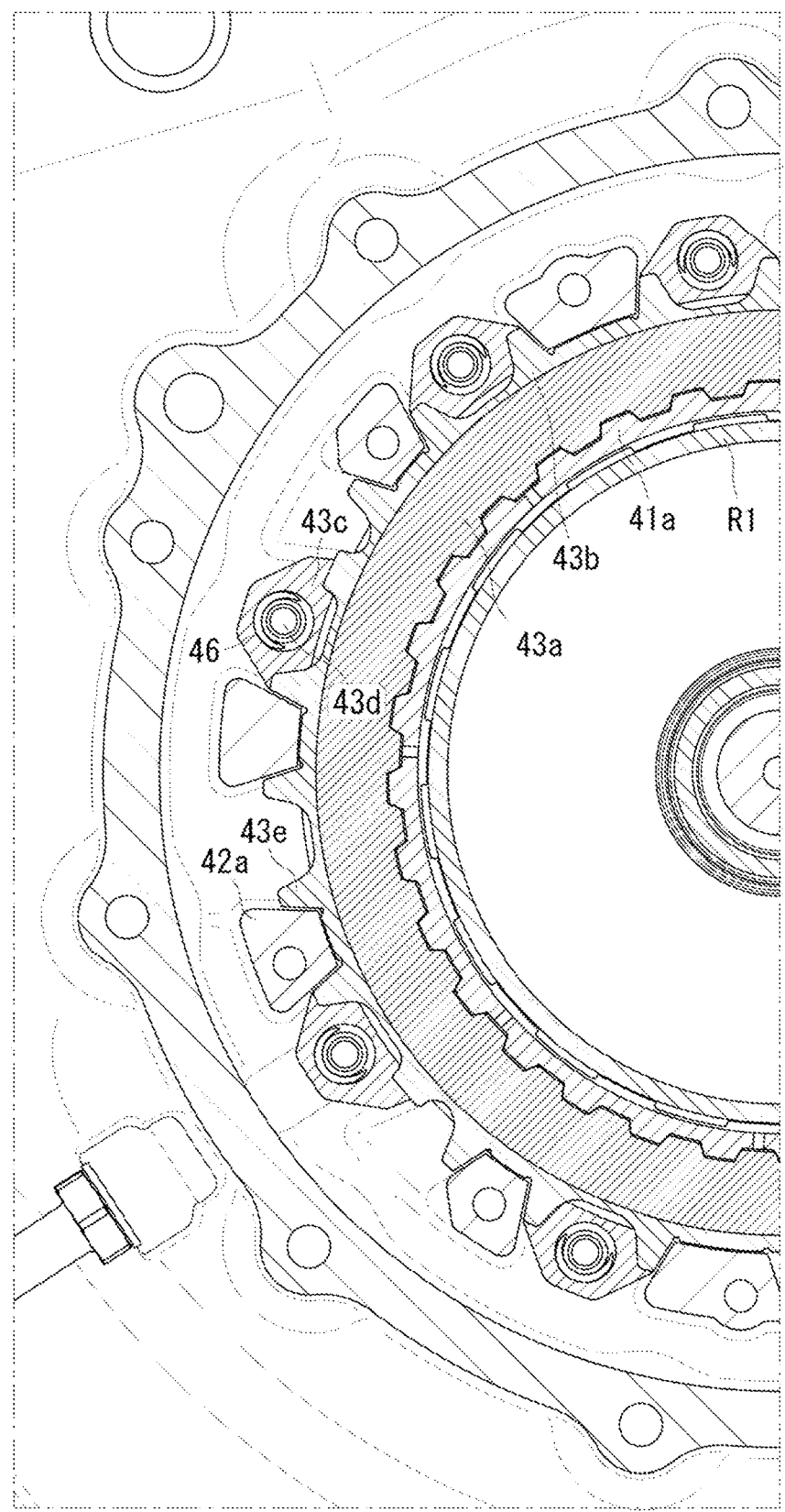
FIG. 8 is a cross-sectional view that is taken along line VIII-VIII in FIG. 4.
Figure 9:
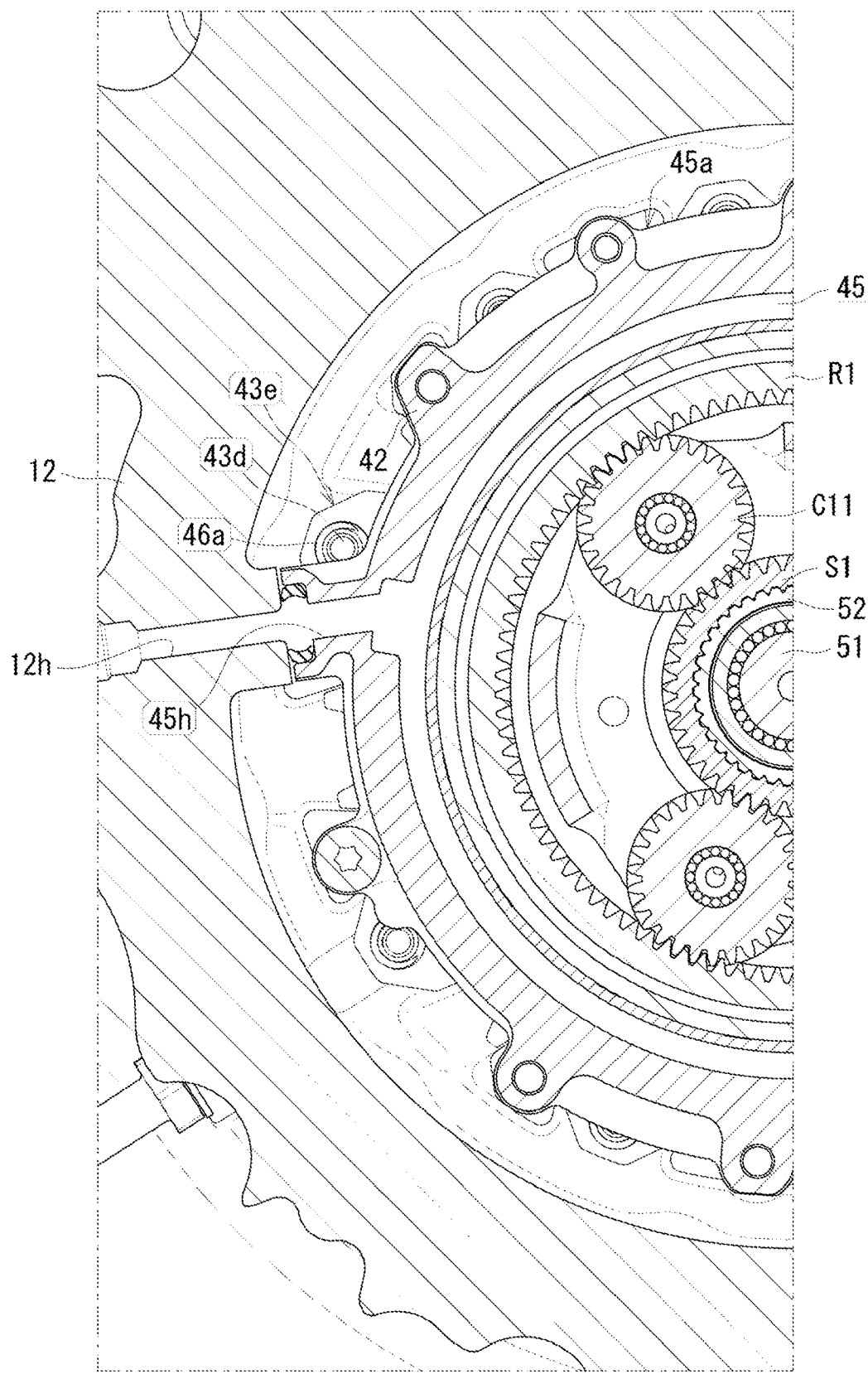
FIG. 9 is a cross-sectional view that is taken along line IX-IX in FIG. 6.

The drum member 42 includes a projected section 42a that extends from the first vertical wall section 11 a toward the opposite drive source side. In this embodiment, as illustrated in FIG. 8 and FIG. 9, the twelve projected section 42a are aligned at substantially equal intervals in the circumferential direction. A spline section 42b, to which the friction plate 43 is spline-fitted, is provided on an inner circumferential side of the projected section 42a. A screw hole 42c (see FIG. 4) is provided in a part of the projected section 42a. On the opposite drive source side of the projected section 42a, a hydraulic chamber component 45a is disposed to form the hydraulic chamber 45.

The hydraulic chamber component 45a has an outer axial section 45b that extends in the axial direction, a radial section 45c that extends radially inward from an end portion on the opposite drive source side of the outer axial section 45b, an inner axial section 45d that extends in the axial direction from an inner end portion of the radial section 45c toward the drive source side, and a flange section 45e that is projected radially outward from the outer axial section 45b.

Figure 7:
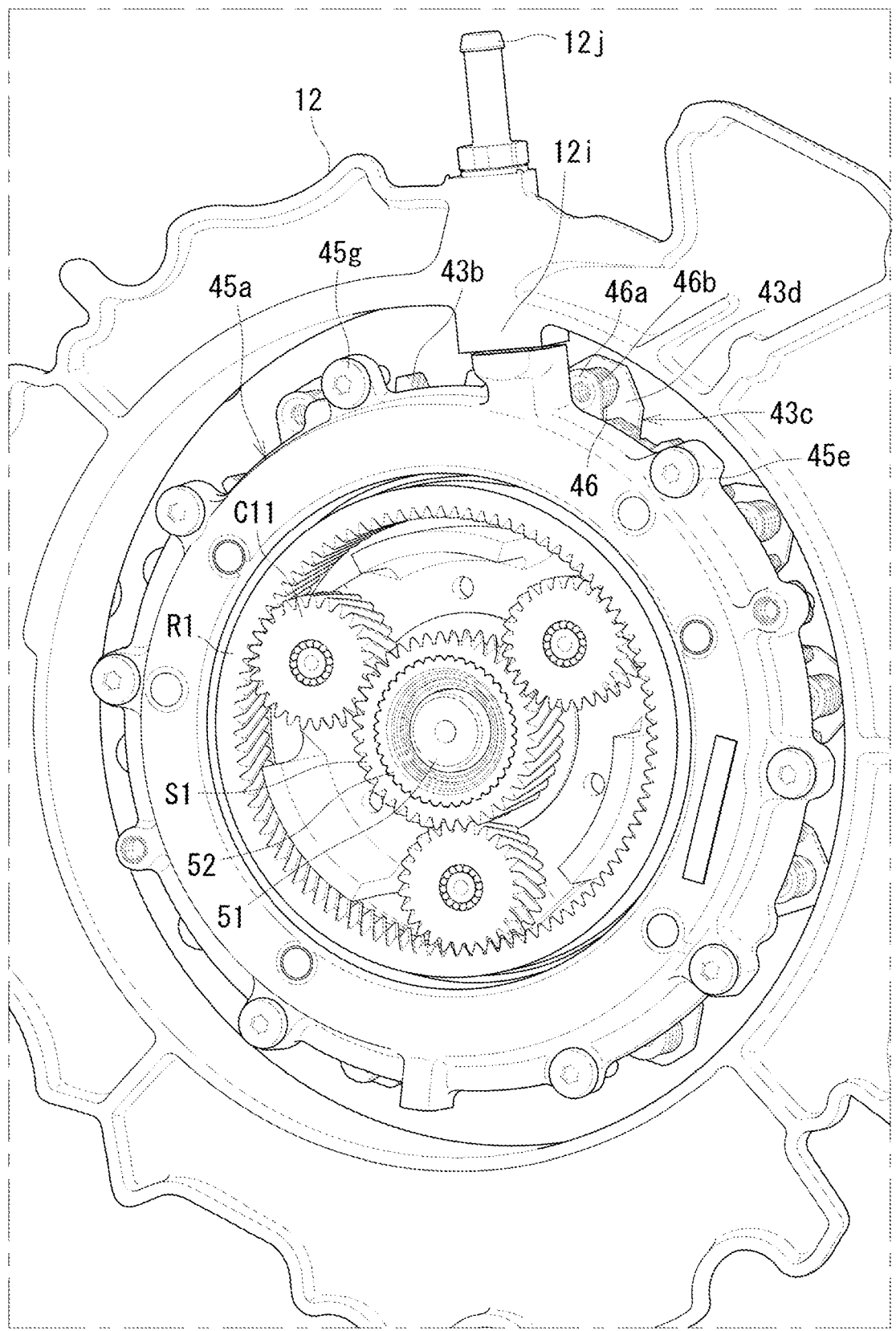
FIG. 7 is a perspective view of a first brake in the power transmission system and surroundings thereof.

A plurality of flange sections 45e are provided at circumferential positions corresponding to screw holes 42b (see FIG. 7). As illustrated in FIG. 4, a through hole 45f is provided in the flange section 45e in a manner to pass therethrough in the axial direction. The hydraulic chamber component 45a is fixed to the transmission case 10 (the projected section 42a) by inserting a bolt 45g through the through hole 45f and screwing the bolt 45g into the screw hole 42b.

The piston 44 has a disc-shaped pressing section 44a that is arranged on the opposite drive source side of the plurality of friction plates 43 and presses the friction plates 43 during engagement, a first cylindrical section 44b that extends from an end portion on a radially outer side of the pressing section 44a to the opposite drive source side, and a second cylindrical section 44c that extends from an end portion on a radially inner side of the pressing section 44a to the opposite drive source side.

The hydraulic pressure chamber 45 is formed by a surface on the drive source side of the radial section 45c, a surface on the opposite drive source side of the pressing section 44a of the piston 44, an inner circumferential surface of the outer axial section 45b, and an outer circumferential surface of the inner axial section 45d.

Figure 6:
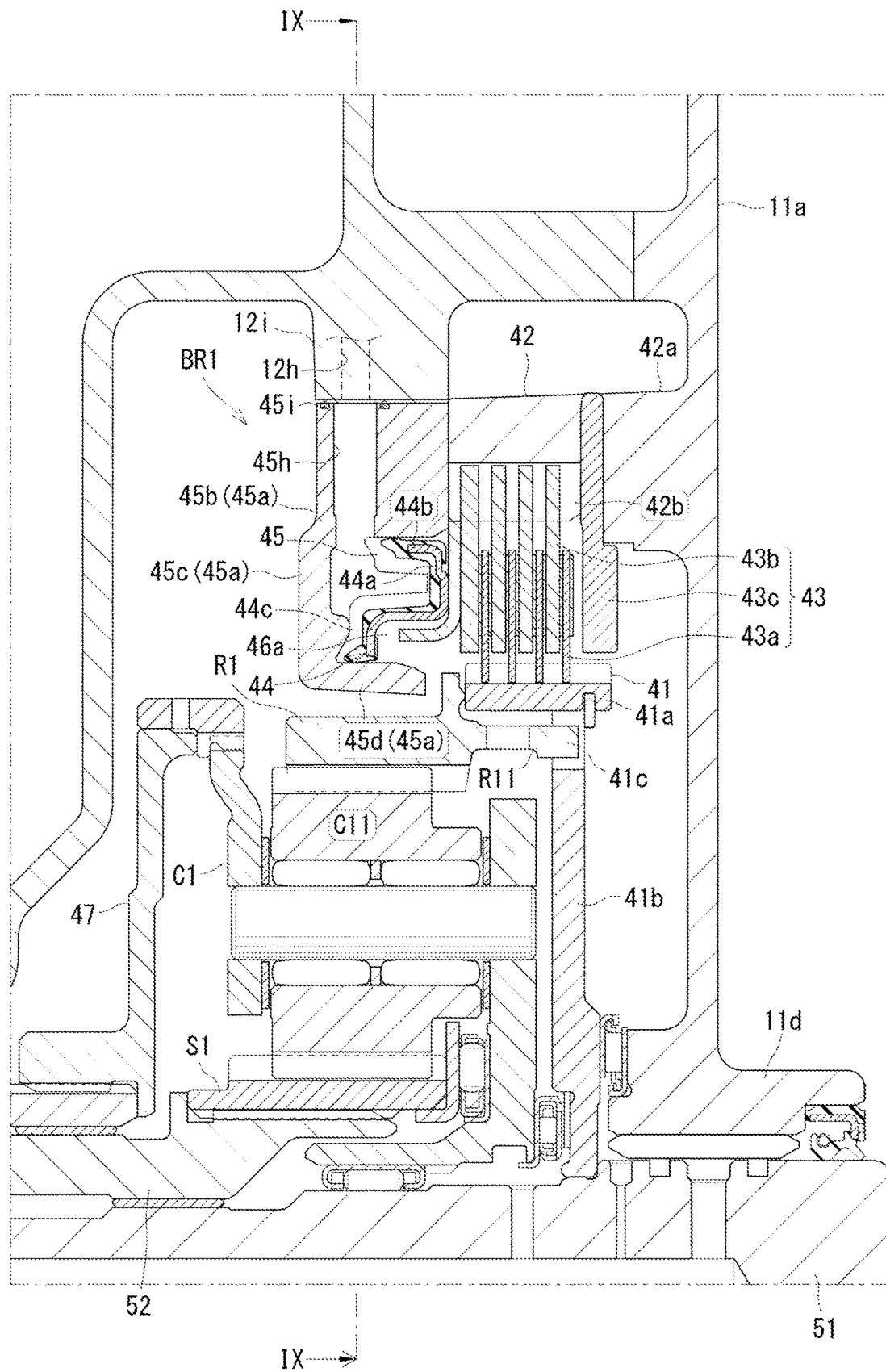
FIG. 6 is an enlarged cross-sectional view of the power transmission system and the surroundings thereof in further another cross section.

As illustrated in FIG. 6, an engagement oil channel 45h, through which engagement hydraulic oil is supplied to the hydraulic chamber 45, is provided in the flange section 45e of the hydraulic chamber component 45a. As illustrated in FIG. 6 and FIG. 7, the second case member 12 is provided with a communicating section 12i that is provided to be projected radially inward at a position opposing the flange section 45e of the hydraulic chamber component 45a and that includes an engagement oil channel 12h therein. An inner circumferential surface of the communicating section 12i of the second case member 12 and an outer circumferential surface of the flange section 45e of the hydraulic chamber component 45a are provided to abut each other, and are arranged such that the engagement oil channel 12h of the second case member 12 and the engagement oil channel 45h of the hydraulic chamber component 45a communicate with each other. A connected portion of the engagement oil channel 12h of the second case member 12 with the engagement oil channel 45h of the hydraulic chamber component 45a is sealed by a seal member 45i. The engagement oil channels 45h, 12h are connected to a valve body (not illustrated) via a valve body connection section 12j that is provided in the second case member 12.

The plural friction plates 43 include a plurality of inner friction plates 43a that are spline-fitted to a radially outer side of the hub member 41 and a plurality of outer friction plates 43b that are spline-fitted to a radially inner side of the drum member 42. The inner friction plates 43a and the outer friction plates 43b are alternately arranged in the axial direction.

Of the plurality of outer friction plates 43b, a drive source side friction plate 43c that is located the closest to the drive source side functions as a retaining plate. The drive source side friction plate 43c has a plurality of spline teeth 43d that extend to the radially outer side of the outer friction plate 43b, and is spline-fitted to the projected section 42a of the drum member 42. In this embodiment, the plural spline teeth 43d of the drive source side friction plate 43c are provided at 10 positions and are arranged at substantially equal intervals or the like in the circumferential direction.

The spline tooth 43d of the drive source side friction plate 43c is formed to have a greater circumferential width than a spline tooth 43e of each of the outer friction plates 43b excluding the drive source side friction plate 43c. The spline tooth 43d of the drive source side friction plate 43c is arranged to be shifted in the circumferential direction from a top land of the spline tooth 43e of each of the outer friction plates 43b excluding the drive source side friction plate 43c. A top land of the drive source side friction plate 43c is arranged at a circumferential position that corresponds to a bottom land of each of the outer friction plates 43b excluding the drive source side friction plates 43c.

Figure 5:
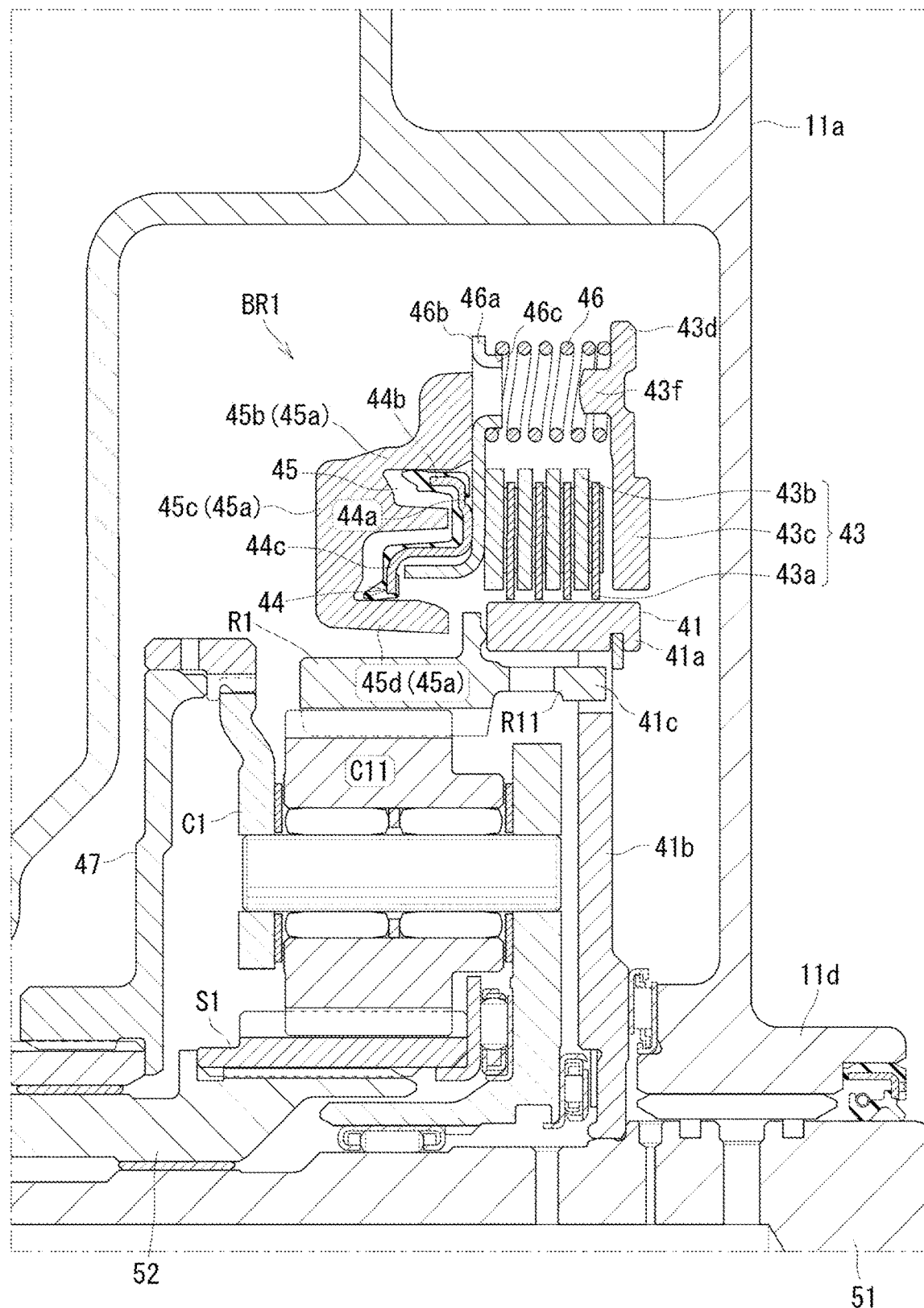
FIG. 5 is an enlarged cross-sectional view of the power transmission system and the surroundings thereof in another cross section.

As illustrated in FIG. 5, a holding plate 46a is disposed on the opposite drive source side of the plurality of friction plates 43 to hold an end portion on the opposite drive source side of the return spring 46. Similar to the drive source side friction plate 43c, the holding plate 46a has a plurality of spline teeth 46b that extend to the radially outer side of the outer friction plates 43b excluding the drive source side friction plate 43c, and is spline-fitted to the projected sections 42a of the drum member 42. In this embodiment, the spline teeth 46b of the holding plate 46a are provided at 10 positions in a manner to correspond to the spline tooth 43d of the drive source side friction plate 43c, and are arranged at substantially equal intervals or the like in the circumferential direction.

Between the spline teeth 43d on the drive source side and the holding plate 46a, a plurality of return springs 46, each of which includes a coil spring extending in the axial direction, are aligned in the circumferential direction.

The spline teeth 46b of the retaining plate 46a are provided with a plurality of spring guide sections 46c that are projected cylindrically to the drive source side and to each of which respective one of the plurality of return springs 46 are attached. The spline teeth 43d of the drive source side friction plate 43c are provided with a plurality of spring guide sections 43f that are projected to the opposite drive source side and to each of which respective one of the plurality of return springs 46 is attached. The plurality of return springs 46 are arranged at positions that overlap in the axial direction and the radial direction. Here, it is set such that, of the plurality of projected sections 42a of the drum member 42, a width of separation between the adjacent projected sections 42a is greater than a diameter of the return spring 46.

When the engagement hydraulic pressure is discharged from the hydraulic chamber 45, the piston 44 moves to the opposite drive source side in the disengagement direction via the holding plate 46a by the return spring 46 and cancels the joint between the hub member 41 and the drum member 42. In this way, the first brake BR1 is disengaged.

As illustrated in FIG. 4, the first gear set PG1 is arranged on a radially inner side of the first brake BR1. As described above, the ring gear R1 of the first gear set PG1 integrally rotates with the hub member 41. The ring gear R1 meshes with a plurality of pinion gears C11 that are arranged on a radially inner side of the ring gear R1 and are coupled by the carrier C1. The pinion gears C11 mesh with the sun gear S1 that is arranged on a radially inner side of the pinion gears C11.

The carrier C1 is coupled to the rotor support member 34 that is connected to the rotor 33 via a power transmission member 47. As illustrated in FIG. 3, the power transmission member 47 is arranged on the outer circumferential side of the output shaft 52 of the power transmission system 5, passes through the second inner vertical wall section 12c of the second case member 12 in the axial direction, and extends to the inside of the third case member 13.

The power transmission member 47 has a carrier connection section 47a that is connected to the carrier C1 and extends radially, an axial section 47b that is spline-fitted to a spline section provided in an end portion on the radially inner side of the carrier connected section 47a and extends to the opposite drive source side, and a motor connection section 47c that extends from an end portion on the opposite drive source side of the axial section 47b toward the motor 3 on the radially outer side.

The power transmission member 47 is supported to be rotatable about the output shaft 52 via a bearing that is disposed between an inner circumferential surface of the axial section 47b and an outer circumferential surface of the output shaft 52. The power transmission member 47 is also supported to be rotatable with respect to the second case member 12 via a bearing that is disposed between an outer circumferential surface of the axial section 47b and an inner circumferential surface of the second axial section 12g of the second case member 12.

A spline section 47d is provided on the radially outer side of the power transmission member 47. The spline section 47d extends in the axial direction and is fitted to a spline section that is provided on an inner circumferential surface of the rotor support member 34 of the motor 3.

The rotor support member 34 of the motor 3 has a cylindrical section 34a that extends in the axial direction and a disk section 34b that extends radially inward from an end portion on the drive source side of the cylindrical section 34a. The rotor 33 is supported to be rotatable with respect to the second case member 12 via a bearing that is disposed between an inner end portion of the disk section 34b of the rotor support member 34 and an outer circumferential surface of the second axial section 12g of the second case member 12.

As illustrated in FIG. 3, the second gear set PG2 is arranged on the radially inner side of the motor 3, and an end portion on the drive source side of the ring gear R2 of the second gear set PG2 and the spline section 47d of the power transmission member 47 are joined to each other by welding or the like. The motor 3 (the rotor 33) integrally rotates with the ring gear R2.

The ring gear R2 meshes with a plurality of pinion gears C21 that are arranged on the radially inner side of the ring gear R2 and are coupled by the carrier C2. The pinion gears C21 mesh with the sun gear S2 that is arranged on the radially inner side of the pinion gears C21.

The carrier C2 is coupled to the output shaft 52 of the power transmission system 5 via a power transmission section 48 that extends to the opposite drive source side from an end portion on the radially inner side of the carrier C2. A spline section provided on an inner circumferential surface of the power transmission section 48 and a spline section provided on the outer circumferential surface of the output shaft 52 are spline-fitted to each other, and the carrier C2 and the output shaft 52 thereby rotate integrally.

A hub member 71 of the second brake BR2 arranged on the opposite drive source side of the sun gear S2 is connected to the sun gear S2. A radial section 71b, which will be described below, of the hub member 71 is connected to an end portion on the opposite drive source side of the sun gear S2 by welding or the like.

The second brake BR2 has the hub member 71, a drum member 72 that is provided in a manner to be projected to the drive source side from the transmission case 10 (in detail, the third vertical wall section 13a of the third case member 13), a plurality of friction plates 73 that are arranged between the hub member 71 and the drum member 72 and alternately spline-fitted to the hub member 71 and the drum member 72, a piston 74 that is arranged on the drive source side of the plural friction plates 73, a hydraulic chamber 75 that is provided on the drive source side of the piston 74, and a return spring (not illustrated).

In the second brake BR2, when the engagement hydraulic pressure is supplied to the hydraulic chamber 75, the piston 74 moves to the opposite drive source side in the engagement direction, presses the plurality of friction plates 73, and joins the hub member 71 and the drum member 72. In this way, the second brake BR2 is engaged.

In addition, in the second brake BR2, when the engagement hydraulic pressure is discharged from the hydraulic chamber 75, the piston 74 moves to the drive source side in the disengagement direction by the return spring and cancels joint between the hub member 71 and the drum member 72. In this way, the second brake BR2 is disengaged.

The hub member 71 includes an inner cylindrical section 71a to which the friction plate 73 is spline-fitted, the radial section 71b that extends radially inward along the third vertical wall section 13a of the third case member 13 from an end portion on the drive source side of the inner cylindrical section 71a, and an axial section 71c that extends to the drive source side and the opposite drive source side from a radially inner end portion of the radial section 71b.

The axial section 71c is supported to be rotatable about the output shaft 52 via a bearing that is arranged between an inner circumferential surface on the drive source side and the outer circumferential surface of the output shaft 52, and is supported to be rotatable with respect to the third case member 13 via a bearing that is arranged between an outer circumferential surface on the opposite drive source side and an inner circumferential surface of the third axial section 13g of the third case member 13. The hub member 71 integrally rotates with the sun gear S2 of the second gear set PG2.

As illustrated in FIG. 3, the drum member 72 includes a projected section 72a that extends from the third vertical wall section 13a toward the drive source side. In this embodiment, similar to the first brake BR1, a plurality of projected sections 72a are formed to be aligned at substantially equal intervals in the circumferential direction. A spline section 72b, to which the friction plate 73 is spline-fitted, is provided on an inner circumferential side of the projected section 72a. A screw hole 72c is provided in a part of the projected section 72a, and a hydraulic chamber component 75a for forming the hydraulic chamber 75 is disposed on the drive source side of the projected section 72a. Similar to the first brake BR1, the hydraulic chamber component 75a is fixed to the transmission case 10 (the projected section 72a) by inserting a bolt 75g through a through hole 75f provided in the hydraulic chamber component 75a and screwing the bolt 75f into a screw hole 72c.

The plurality of friction plates 73 include a plurality of inner friction plates 73a that are spline-fitted to a radially outer side of the hub member 71 and a plurality of outer friction plates 73b that are spline-fitted to a radially inner side of the drum member 72. The inner friction plates 73a and the outer friction plates 73b are alternately arranged in the axial direction.

Here, a detailed structure of the second brake BR2 differs from that of the first brake BR1 in points that the engagement direction thereof is not the drive source side but the opposite drive source side and that the hub member 71 is connected to the sun gear S2 of the second planetary gear set PG2. However, except for the above, the structure of the second brake BR2 is substantially the same as that of the first brake BR1. Accordingly, configurations of the hydraulic chamber component 45a, the piston 74, the hydraulic chamber 75, and the friction plate 73 will not be described.

Figure 10:
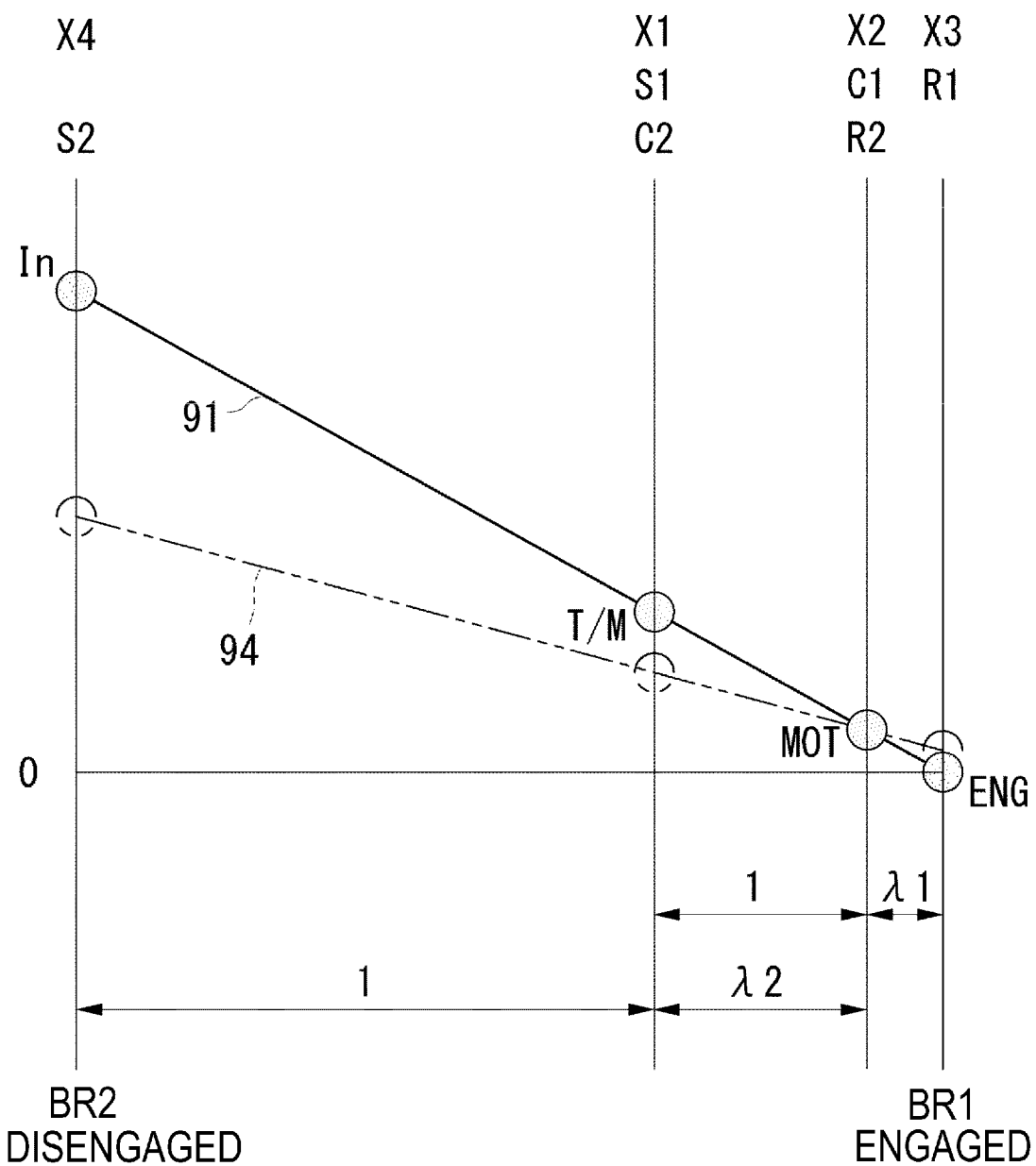
FIG. 10 is a speed chart of the power transmission system during EV travel.
Figure 11:
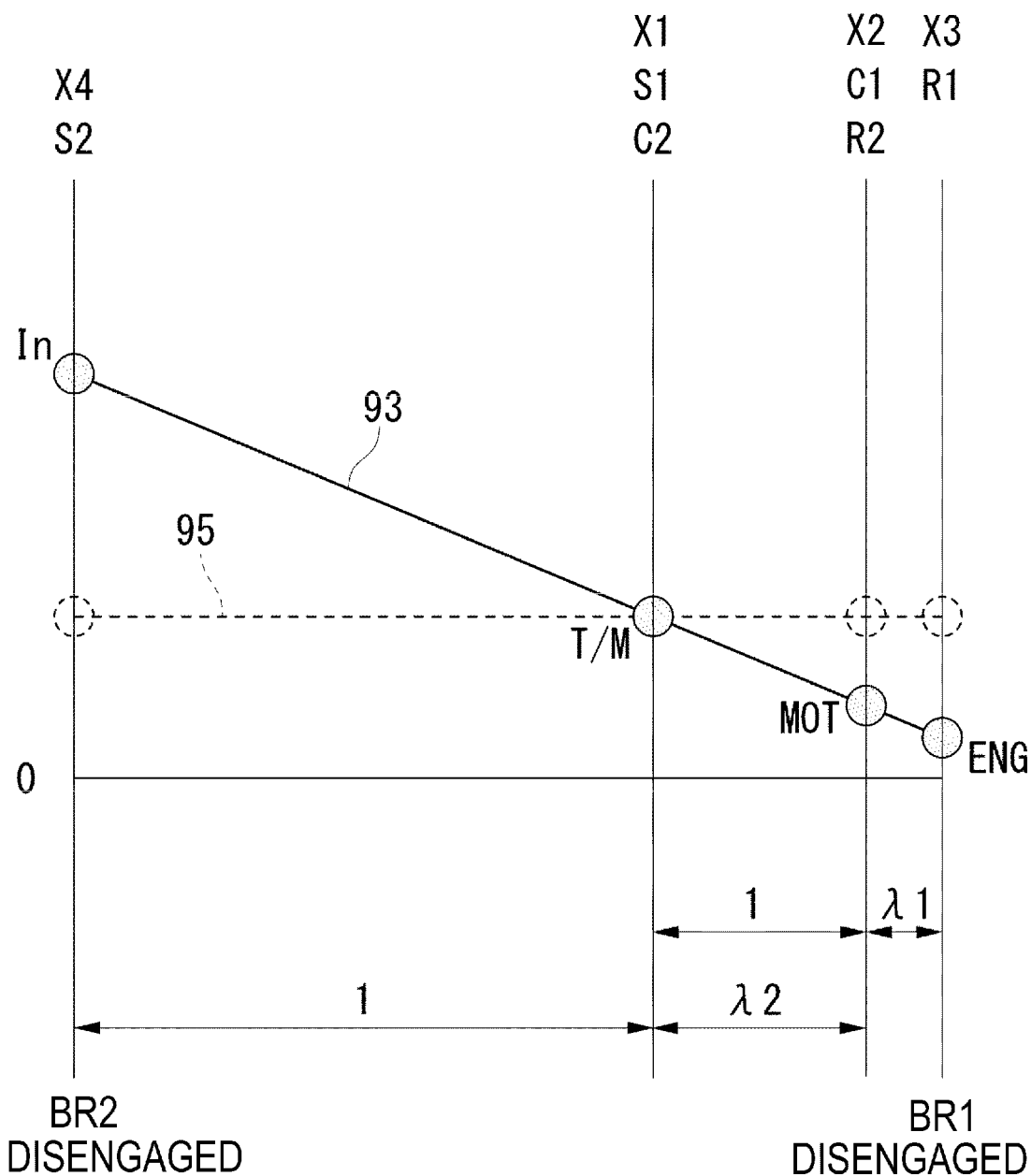
FIG. 11 is a speed chart of the power transmission system at an engine start.
Figure 12:
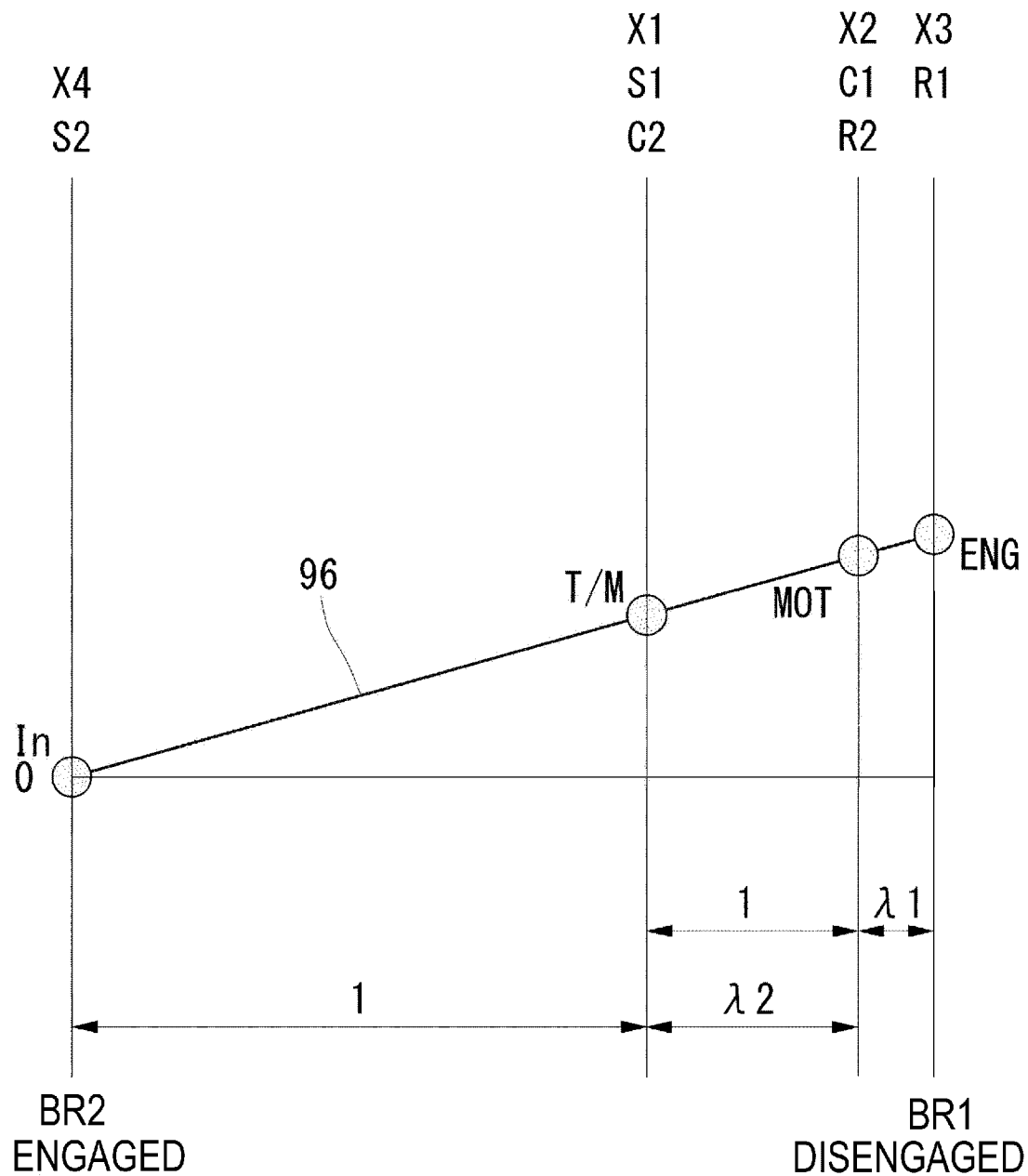
FIG. 12 is a speed chart of the power transmission system during HEV travel.

FIG. 10 to FIG. 12 are so-called speed charts (co-linear charts) for explaining a relationship among rotational speeds $\omega r$, $\omega m$, $\omega e$, and $\omega i$ of the six rotary elements S1, S2, C1, C2, R1, and R2 in the first gear set PG1 and the second gear set PG2. As it is well known, the speed chart is a chart in which speed axes representing the rotary elements in the planetary gears are drawn in parallel with each other at intervals corresponding to gear ratios of the rotary elements, and a distance from a reference line, which is orthogonal to these speed axes, (a line in which the rotational speed of each of the rotary elements is zero) corresponds to the rotational speed of each of the rotary elements. In this embodiment, a ratio of the number of teeth Zr1 of the ring gear R1 to the number of teeth Zs1 of the first sun gear S1 (Zs1/Zr1) will be described as a planetary gear ratio $\lambda 1$ that is a first gear ratio, and a ratio of the number of teeth Zr2 of the ring gear R2 to the number of teeth Zs2 of the second sun gear S2 (Zs2/Zr1) will be described as a planetary gear ratio $\lambda 2$ that is a second gear ratio.

As described above, in this embodiment, the sun gear S1 of the first gear set PG1 and the carrier C2 of the second gear set PG2 are mechanically joined to constitute the first rotary element X1, the carrier C1 of the first gear set PG1 and the ring gear R2 of the second gear set PG2 are mechanically joined to constitute the second rotary element X2, the ring gear R1 of the first gear set PG1 constitutes the third rotary element X3, and the sun gear S2 of the second gear set PG2 constitutes the fourth rotary element X4. In other words, the power transmission system 5 includes the first through fourth rotary elements X1, X2, X3, X4 as the plurality of rotary elements.

As illustrated in FIG. 10, when the first through fourth rotary elements X1, X2, X3, X4 of the power transmission system 5 in this embodiment are indicated on the speed chart, from a relationship between the first and second gear sets PG1, PG2, the first rotary element X1, the second rotary element X2, and the third rotary element X3 are arranged in this order from one end, and the fourth rotary element X4 is arranged on an end side of the one side from the first rotary element X1. In addition, as illustrated in FIG. 10, in this embodiment, the first through fourth rotary elements X1, X2, X3, X4 are configured that, from a characteristic of the planetary gear mechanism, the rotational speeds thereof on the speed chart are arranged in the same linear line in an order of the fourth rotary element X4, the first rotary element X1, the second rotary element X2, and the third rotary element X3.

The fourth rotary element X4 (the sun gear S2 of the second gear set PG2) and the hub member 71 of the second brake BR2, which is coupled to the sun gear S2, function as the inertial members In that suppress a fluctuation in the rotation of the motor 3, which is connected to the second rotary element X2, by a rotational fluctuation of the engine 2, which is connected to the third rotary element X3.

A description will be made on an operational effect in the case where an engine start method according to this embodiment is implemented with an example in which the hybrid vehicle 1 including the power transmission system 5 illustrated in FIG. 1 travels in an EV travel mode while gradually accelerating with reference to FIG. 10 to FIG. 13.

Figure 13:
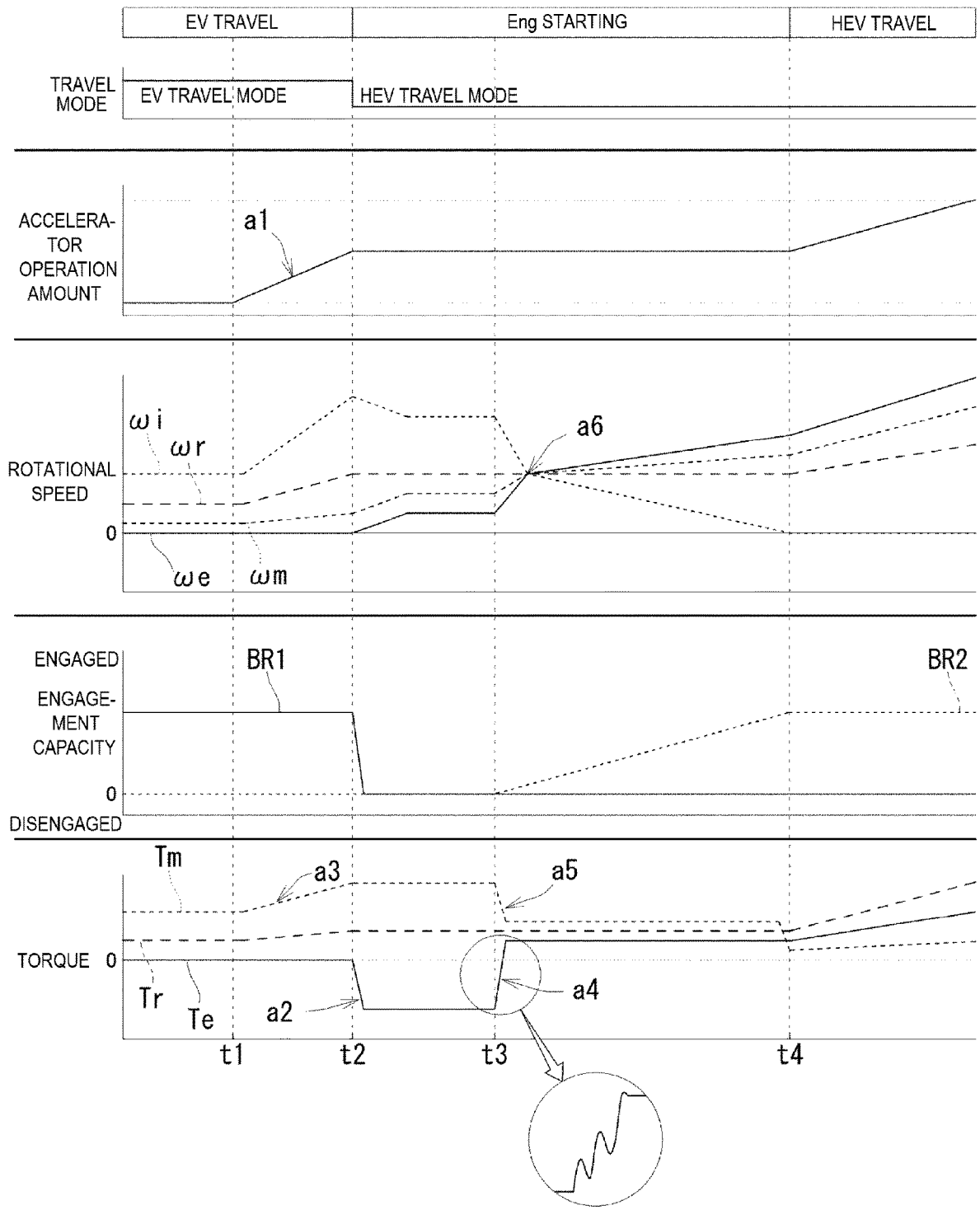
FIG. 13 is an operation time chart in a case where the engine is started in the EV travel and the EV travel is shifted to the HEV travel.

A solid line 91 in FIG. 10 illustrates an example of relative speeds of the rotary elements X1 to X4 in the EV travel mode as a travel mode enabling the EV travel in which the vehicle travels only with the motor 3 as the power source (a state before a time point t2 in FIG. 13). A solid line 93 in FIG. 11 illustrates an example of relative speeds of the rotary elements X1 to X4 at the engine start when the engine 2 is started to switch from the EV travel mode to an HEV travel mode as a travel mode enabling hybrid travel in which the vehicle travels with the motor 3 and the engine 2 as the drive sources (a specified time point in a period from the time point t2 to a time point t3 in FIG. 13). A broken line 95 in FIG. 11 illustrates a state where the rotational speeds of the first through fourth rotary elements X1 to X4 become constant with an increase in a rotational speed of the engine 2 in a period after complete combustion of the engine 2 (the time point t2) to an engagement time point t4 of the second brake BR2. A solid line 96 in FIG. 12 illustrates an example of the relative speeds of the rotary elements X1 to X4 in the HEV travel mode (a state after a time point t4 in FIG. 13). FIG. 13 is an operation time chart in a case where the hybrid vehicle 1 starts the engine 2 in the EV travel and is shifted to the HEV travel.

FIG. 13 is a time chart illustrating torque Te, Tm, Tr, Ti, the rotational speeds ωe, ωm, ωr, ωi, and engagement capacities of the first brake BR1 and the second brake BR2 in regard to the input shaft 51 (the third rotary element X3) of the power transmission system 5 connected to the output shaft 21 of the engine 2, the motor 3 (the second rotary element X2), the output shaft 52 (the first rotary element X1) of the power transmission system 5 connected to the input shaft 40 of the automatic transmission 4, and the inertial member In (the fourth rotary element X4) at the time of engaging the first brake BR1, disengaging the second brake BR2, and driving the motor 3 so as to start the stopped engine 2 during the EV travel.

Prior to the time point t2 during the EV travel, the first brake BR1 is engaged, the second brake BR2 is completely disengaged, the engine 2 is in the stopped state, and the motor 3 is controlled to output transmission torque that is required for the EV travel. In this way, as indicated by the solid line 91 in FIG. 10, the rotational speed ωr of the first rotary element X1 connected to the automatic transmission 4 (hereinafter also referred to as a transmission rotational speed) and the rotational speed ωi of the fourth rotary element X4 (hereinafter also referred to as an inertia rotational speed) are determined from the rotational speed of the third rotary element X3 connected to the engine 2 (hereinafter also referred to as the engine speed) ωe=0 and the rotational speed ωm of the second rotary element X2 connected to the motor 3 for the vehicle travel (hereinafter also referred to as a motor rotational speed). A time point t1 indicates a time point at which an accelerator operation amount is increased by a driver's accelerator operation in the EV travel state, and a period from the time point t1 to the time point t2 indicates a period in which the vehicle can be accelerated by the EV travel.

The time point t2 indicates a time point at which the driver's acceleration request (required torque), which is determined from the accelerator operation amount (an arrow a1 in FIG. 13), exceeds a specified value (for example, an upper limit value of the torque at which the EV travel can be made) and a start request of the engine 2 is made to shift the vehicle from the EV travel to the HEV travel.

As illustrated at the time point t2, at the time of shifting from the EV travel to the HEV travel, the first brake BR1 is disengaged in order to start the engine 2 that has been brought into the stopped state by engaging the first brake BR1. When the first brake BR1 is disengaged, the torque of the motor 3 starts being transmitted to the output shaft 21 of the engine 2.

At this time, when the motor 3 outputs the torque for cranking the engine 2, in the period from the time point t2 to the time point t3 of the complete combustion of the engine 2, the speed of the engine 2 is gradually increased (the solid line 93 in FIG. 11), friction torque and inertia torque are generated in association with rotation of the engine 2, and torque of the engine 2 becomes negative torque (an arrow a2 in FIG. 13).

In the period from the time point t2 to the time point t3, the rotational speed of the motor 3 is maintained at a rotational speed that corresponds to a vehicle speed of the vehicle, and the torque of the motor 3 varies by the torque required for cranking. Accordingly, the drive power is possibly reduced due to the friction torque, the inertia torque, or the like that is associated with cranking of the engine 2. In such a case, the torque of the motor 3 is increased according to the friction torque, the inertia torque, or the like (an arrow a3 in FIG. 13).

At this time, as indicated by the solid line 93 in FIG. 11, the motor rotational speed ωm and the motor torque Tm are controlled to be increased in order to increase the engine speed ωe while maintaining the transmission rotational speed ωr and the transmission torque Tr to be constant.

In this way, for example, when the output of the motor 3 is set to be constant and, as indicated by an imaginary line 94 in FIG. 10, the engine speed ωe is increased by disengaging the first brake BR1, the transmission rotational speed ωr is reduced with the motor rotational speed ωm being a fulcrum due to a characteristic of the speed chart of the planetary gear mechanism. As a result, it is possible to suppress an occupant from feeling discomfort due to failure in maintaining the travel state during the acceleration.

The engine 2 during cranking is supplied with fuel at specified timing, and such fuel is ignited. The time point t3 indicates a time point of the complete combustion at which the engine speed ωe is increased to an idle speed.

After the complete combustion in the engine 2, the engine 2 outputs the torque by itself. Accordingly, coordinated control for the engine 2 and the motor 3 is executed to reduce the motor torque Tm according to the increase in the engine torque Te, and the transmission torque Tr that is transmitted to the automatic transmission 4 is thereby controlled.

In addition, after the complete combustion in the engine 2, due to the start of the engine 2, the engine speed ωe is increased, and the motor rotational speed ωm is increased. Meanwhile, the inertia rotational speed ωi is reduced with the transmission rotational speed ωr, which is controlled to be constant, being the fulcrum, and as indicated by the broken line 95 in FIG. 11, a state where the engine speed ωe, the transmission rotational speed ωr, the motor rotational speed ωm, and the inertia rotational speed ωi match occurs (an arrow a6 in FIG. 13).

Even after the state where the first through fourth rotary elements X1, X2, X3, X4 become the same rotational speed, the engine speed ωe and the motor rotational speed ωm keep being increased, and the inertia rotational speed ωi keeps being reduced. Then, as indicated by the solid line 96 in FIG.

12, at a time point t4 at which the inertia rotational speed ωi=0, the second brake BR2 is completely engaged, and the vehicle is brought into the HEV travel state with the engine 2 and the motor 3 as the drive sources. The second brake BR2 may be slipped after the complete combustion in the engine 2, and the second brake BR2 may be controlled to be completely engaged when the inertia rotational speed ωi becomes zero.

By fixing the inertial member In by the engagement of the second brake BR2, the engine torque Te and the motor torque Tm are transmitted to the automatic transmission 4 through a reaction force of the inertial member In.

As indicated by a broken line (an arrow a5) in an enlarged view (an arrow a4) in FIG. 13, the torque fluctuation occurs at the start of the engine 2. Since the engine 2, the motor 3, and the automatic transmission 4 are coupled by the planetary gear mechanisms PG1, PG2, the torque fluctuation of the engine 2 is transmitted to the automatic transmission 4 side. The torque fluctuation transmitted to the automatic transmission 4 side may eventually cause vehicle body vibration.

To handle the above problem, in the present embodiment, it is configured to be able to suppress transmission of the torque fluctuation at the engine start to the automatic transmission 4 side by the inertial member In that is connected to the sun gear S2 of the second gear set PG2 as described above.

A description will be made on an operational effect exerted by the arrangement of the inertial member In with reference to FIG. 14. Similar to the solid line 93 in FIG. 11, a solid line 93 in FIG. 14 indicates a speed chart of the rotary elements at the engine start when the EV travel is shifted to the HEV travel.

Figure 14:
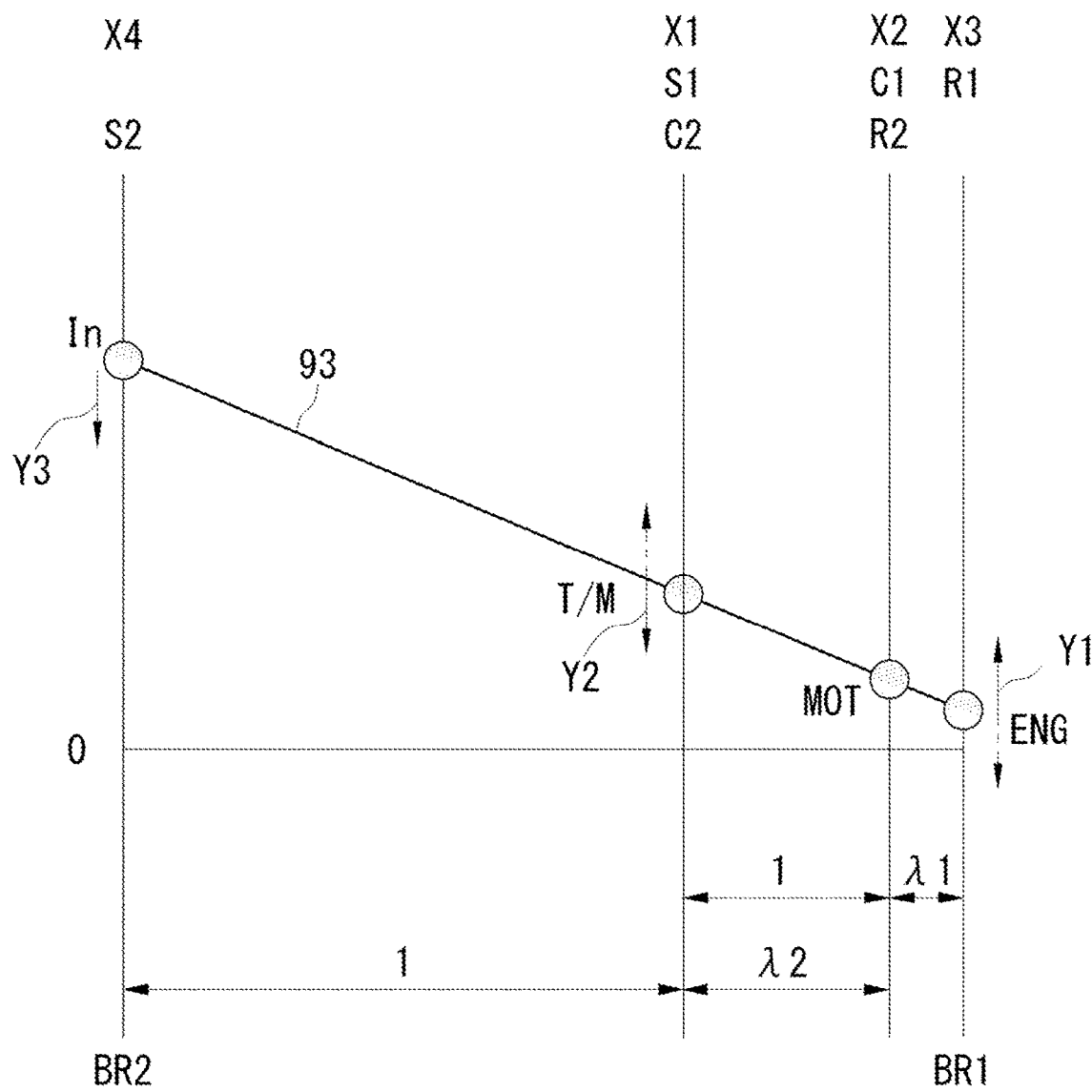
FIG. 14 is a speed chart of the power transmission system at the engine start.

As illustrated in FIG. 14, in the case where a rotational direction of the engine is set as a positive direction and a torque fluctuation Y1 in the positive direction is input to the third rotary element X3 due to the torque fluctuation the engine 2 at the start, the torque fluctuation Y1, which is input to the third rotary element X3, obtains a reaction force corresponding to inertial mass Im of the second rotary element X2 and attempts to fluctuate the first rotary element X1 in a negative direction. However, in this embodiment, since the fourth rotary element X4 that has a specified inertial mass Ii is arranged on one side of the first rotary element X1 on the speed chart, the torque fluctuation Y2 of the first rotary element X1 in the negative direction is suppressed.

In this embodiment, the hub member 71 is coupled to the fourth rotary element X4 so as to have the inertial mass Ii that is balanced with the inertial mass Im of the second rotary element X2 and the motor 3 coupled to the second rotary element X2. In this way, it is possible to suppress the rotational fluctuation of the fourth rotary element X4 and to suppress the rotational fluctuation of the first rotary element X1 by the fourth rotary element X4 arranged on the one side of the first rotary element X1 and the second rotary element X2 arranged on the other side of the first rotary element X1.

The description has been made on the operational effect during the torque fluctuation of the engine 2 in the positive direction. As shown by the dashed arrows in FIG. 14, the inertial mass Ii of the fourth rotational element X4 and the hub member 71 can similarly suppress the rotational fluctuation of the first rotational element X1 on the speed-up side due to the rotational fluctuation on the deceleration side of the engine 2 at the time of the torque fluctuation in the negative direction of the engine 2.

The inertial mass Ii of the inertial member In is set by the first gear ratio (Zs1/Zr1) λ1, which is the ratio of the number of teeth Zr1 of the ring gear R1 connected to the engine 2 to the number of teeth Zs1 of the sun gear S1 of the first gear set PG1 connected to the transmission 4, and the second gear ratio λ2, which is the ratio (Zs2/Zr2) of the number of teeth Zr2 of the ring gear R1 connected to the motor 3 to the number of teeth Zs2 of the sun gear S2 of the second gear set PG2. In this way, it is possible to further effectively suppress the transmission of the torque fluctuation of the engine 2 to the transmission 4 side.

For example, the inertial mass Ii of the inertial member In and the second gear ratio λ2 are set to be balanced with a relationship between the inertial mass Im of the motor 3 and the first gear ratio λ1. A description will be made on the balance of the inertial mass Ii of the inertial member In and the second gear ratio λ2 with the relationship between the inertial mass Im of the motor 3 and the first gear ratio λ1 by using formulae.

When the power transmission system 5 illustrated in FIG. 14 is expressed on the basis of a fundamental planetary formula, the power transmission system 5 can be expressed by the following formula (1) and formula (2). Here, angular acceleration of the first rotary element X1 (the input shaft 40 of the transmission 4 and the output shaft 52 of the power transmission system 5) is indicated as ωr', angular acceleration of the second rotary element X2 (the motor 3) is indicated as ωm', angular acceleration of the third rotary element X3 (the input shaft 51 of the power transmission system 5) is indicated as ωe', angular acceleration of the fourth rotary element X4 (the inertial member In) is indicated as ωi', the torque of the first rotary element X1 is indicated as Tr, the torque of the second rotary element X2 is indicated as Tm, the torque of the third rotary element X3 is indicated as Te, and the torque of the fourth rotary element X4 is indicated as Ti.

$$Tr+(Tm-Im\omega m')+(Te-Ie\omega e')+(-Ii\omega i')=0 \qquad (1)$$

$$(Tm-Im\omega m')+(\lambda 1+1)(Te-Ie\omega e')+(1/\lambda 2)(-Ii\omega i')=0 \qquad (2)$$

When the fluctuation of the angular acceleration of the transmission 4 is set to 0 (ωr'=0), ωe'=(λ1+1)ωm', ωi'=(1/λ2)ωm', and the torque of the transmission 4 is expressed by formula (3).

$$-Tr=(((\lambda 1+1)\lambda 1)Ie)+(1/\lambda 2)((1/\lambda 2)+1)Ii)Tm+(-\lambda 1\cdot Im+(1/\lambda 2)((1/\lambda 2)+(\lambda 1+1))Ii)Te)/(Im+(\lambda 1+1)^2 Ie+(1/\lambda 2)^2 Ii) \qquad (3)$$

In the formula (3), by setting −λ1·Im+(1/λ2)((1/λ2)+(λ1+1))Ii, which is a coefficient contributing to the torque fluctuation of the engine 2, to 0, it is possible to suppress the transmission of the torque fluctuation of the engine 2 to the transmission 4 side. In other words, the torque fluctuation of the engine 2 can be offset by establishing the formula (4).

$$\lambda 1\cdot Im=(1/\lambda 2)\cdot(1/\lambda 2+(\lambda 1+1))\cdot Ii \qquad (4)$$

By setting the inertial mass Ii of the inertial member In and the second gear ratio λ2 to satisfy the formula (4), it is possible to suppress the transmission of the torque fluctuation to the transmission 4 side due to the torque fluctuation of the engine 2 input to the third rotary element X3.

As in the configuration described so far, since the fourth rotary element X4 is configured as the inertial member In for suppressing the transmission of the torque fluctuation of the engine 2 to the transmission 4 side, it is possible to suppress the transmission of the torque fluctuation of the rotary element, which is caused by the torque fluctuation of the engine 2, to the transmission 4.

More specifically, when the torque fluctuation in the positive direction is input to the third rotary element X3 due to the torque fluctuation of the engine 2 at the start, this torque fluctuation obtains the reaction force of the second rotary element X2 and attempts to fluctuate the torque of the first rotary element X1 in the negative direction. However, since the fourth rotary element X4 functions as the inertial member In for suppressing the rotational fluctuation of the first rotary element X1, the transmission of the torque fluctuation of the engine 2 to the transmission 4 side is suppressed.

In addition, since the engine 2, the motor 3, and the automatic transmission 4 are coupled to the constantly meshing planetary gear mechanisms PG1, PG2, it is possible to transmit the drive power of the motor 3 to the engine 2 and thereby start the engine 2 simply by disengaging the first brake BR1 without executing the slip control.

For example, compared to a case where the engine 2 and the motor 3 with a difference in rotation are engaged under the slip control, as in the power transmission system 5 that includes a clutch for engaging and disengaging the engine 2 with and from the motor 3, energy loss of the drive power of the motor 3 is suppressed.

On the speed chart, in the planetary gear mechanisms PG1, PG2, the fourth rotary element X4 is arranged on the one side of the first rotary element X1. Accordingly, when the torque fluctuation in the positive direction is input to the third rotary element X3 due to the torque fluctuation of the engine 2 at the start of the engine 2, the torque fluctuation, which is input to the third rotary element X3, obtains the reaction force corresponding to the inertial mass Im of the second rotary element X2 and attempts to fluctuate the first rotary element X1 in the negative direction. However, since the fourth rotary element X4 that has the specified inertial mass is arranged on the one side of the first rotary element X1, the torque fluctuation of the first rotary element X1 in the negative direction is suppressed.

In this embodiment, the inertial mass Ii, which is balanced with the inertial mass Im of the second rotary element X2 and the motor 3 coupled to the second rotary element X2, is applied to the fourth rotary element X4. Thus, it is possible to suppress the rotational fluctuation of the fourth rotary element X4. In this way, it is possible to suppress the rotational fluctuation of the first rotary element X1 by the fourth rotary element X4, which is arranged on the one side of the first rotary element X1, and the second rotary element X2, which is arranged on the other side of the first rotary element X1.

In addition, the planetary gear mechanisms PG1, PG2 obtain the above effects only with a simple structure of including the first gear set PG1 and the second gear set PG2 and respectively coupling two rotary elements of the three rotary elements constituting the first gear set PG1 to two rotary elements of the three rotary elements constituting the second gear set PG2 to constitute two of the first rotary element X1, the second rotary element X2, and the third rotary element X3.

The inertial mass Ii, which is balanced with the inertial mass Im of the second rotary element X2 and the motor 3 coupled to the second rotary element X2, is set for the fourth rotary element X4. Thus, it is possible to suppress the rotational fluctuation of the fourth rotary element X4. In this way, it is possible to suppress the rotational fluctuation of the first rotary element X1 by the fourth rotary element X4, which is arranged on the one side of the first rotary element X1, and the second rotary element X2, which is arranged on the other side of the first rotary element X1.

The inertial mass Ii of the inertial member In is set by the number of teeth of each of the first through fourth rotary elements X1 to X4 and the inertial mass Im of the motor 3. Thus, it is possible to further effectively suppress the torque fluctuation of the engine 2.

The inertial mass Ii of the inertial member In and the second gear ratio $\lambda 2$ are set to be balanced with the relationship between the inertial mass Im of the motor 3 and the first gear ratio $\lambda 1$, which contributes to the transmission of the torque fluctuation of the engine 2 to the transmission 4 side. Thus, it is possible to further effectively suppress the torque fluctuation of the engine 2.

Due to provision of the second brake BR2, which is engaged during the HEV travel and engages and disengages the fourth rotary element X4 with and from the transmission case 10, it is possible to change the rotational speeds of the engine 2 and the automatic transmission 4 from each other during the HEV travel. In this way, it is possible to accelerate or decelerate the rotation of the engine 2 and transmit the accelerated or decelerated rotation to the automatic transmission 4 side in consideration of efficiency of the engine 2 and the automatic transmission 4.

In addition, since the motor 3 is connected to the second rotary element X2, it is possible to efficiently distribute the drive power of the motor 3 to the first rotary element X1 side and the third rotary element X3 side.

More specifically, for example, in the case where the engine 2 is connected to the second rotary element X2 and it is attempted to start the engine 2 while maintaining a constant drive state, in order to increase the rotational speed of the second rotary element X2 while maintaining the rotational speed of one of the first and third rotary elements X1, X3 to be constant, it is necessary to increase an increase allowance of the rotational speed of the motor 3, which is connected to the other of the first and third rotary elements X1, X3, in comparison with a case where the motor 3 is connected to the second rotary element X2.

Similarly, for example, in the case where the automatic transmission 4 is connected to the second rotary element X2 and it is attempted to start the engine 2 while maintaining the constant drive state, in order to increase the rotational speed of one of the first and third rotary elements X1, X3 while maintaining the rotational speed of the second rotary element X2 to be constant, it is necessary to increase the increase allowance of the rotational speed of the motor 3, which is connected to the other of the first and third rotary elements X1, X3, in comparison with the case where the motor 3 is connected to the second rotary element X2.

The first rotary element X1 has the sun gear S1 of the first gear set PG1, and the automatic transmission 4 is connected thereto. The second rotary element X2 has the carrier C2 of the first gear set PG1. The third rotary element X3 has the ring gear R1 of the first gear set PG1, and the engine 2 is connected thereto. Accordingly, the rotation of the motor 3, which is input to the carrier C1, is decelerated by the ring gear R1 and is transmitted to the engine 2. Thus, compared to a case where the engine 2 is connected to the sun gear S1, the torque for starting the engine 2 can easily be obtained.

The present disclosure is not limited to the exemplary embodiment, and various improvements and design changes can be made thereto within the scope that does not depart from the gist of the present disclosure.

The description has been made on the configuration of the hybrid vehicle 1 in this embodiment that the damper device 6 is mounted. However, the damper device 6 may not be mounted. In such a case, it may be configured to directly connect the output shaft 21 of the engine 2 to the input shaft 51 of the power transmission system 5.

In the hybrid vehicle 1 of this embodiment, the description of mounting the automatic transmission 4 has been described. However, the transmission that is connected to the power transmission system 5 is not limited thereto. The transmission may be a manual transmission, a dual-clutch transmission, a CVT, or the like.

In this embodiment, the description has been made on the configuration in which the fourth rotary element is arranged on the one side of the first rotary element on the speed chart. However, the fourth rotary element may be arranged on the other side of the third rotary element. In this case, the inertial mass Ii of the inertial member In and the second gear ratio $\lambda 2$ only need to be set to satisfy a formula (5).

$$\lambda 1 \cdot \text{Im} = 1/\lambda 2 (1/\lambda 2 - (1+\lambda 1)) \cdot \text{Ii} \quad (5)$$

In this way, it is possible to suppress the transmission of the torque fluctuation to the transmission 4 side due to the torque fluctuation of the engine 2 input to the third rotary element X3.

Figure 15A:
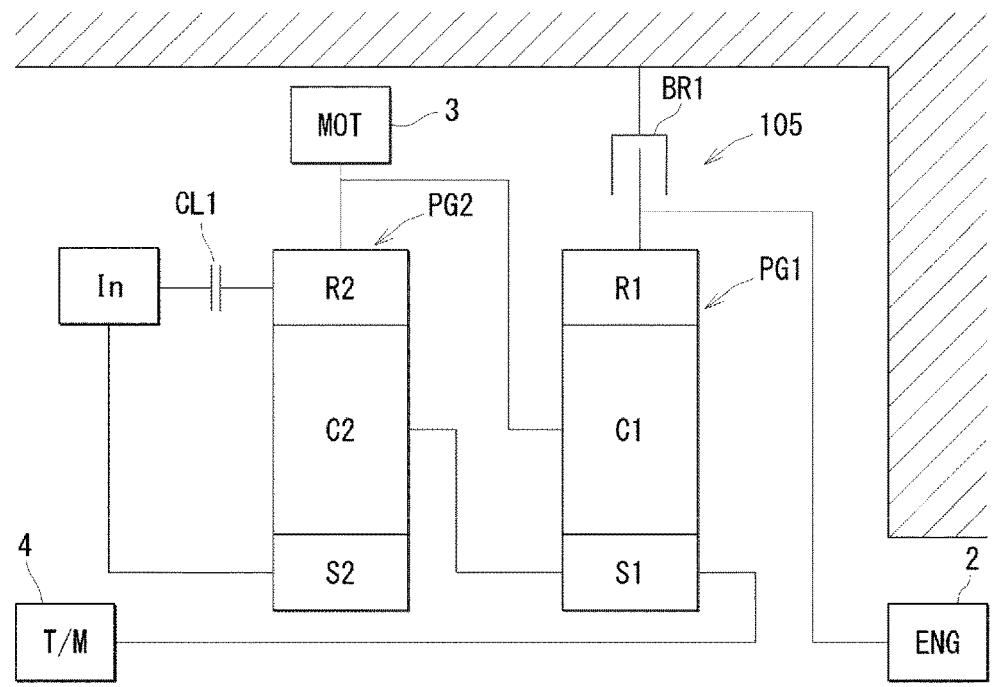
FIG. 15A is a schematic diagram and FIG. 15B is a speed chart of a power transmission system in a first modified embodiment.

In this embodiment, the description has been made so far on the configuration of obtaining the HEV travel state by engaging the second brake BR2. However, as illustrated in FIG. 15A, instead of the second brake BR2, a power transmission system 105 may include a clutch CL1 that is provided between the inertial member In and the ring gear R2 of the second gear set PG2 and engages and disengages the inertial member In with and from the ring gear R2. The clutch CL1 is not limited to one that engages and disengages the inertial member In with and from the ring gear R2, and may be one that synchronizes the rotation of any two of the first through fourth rotary elements.

Figure 15B:
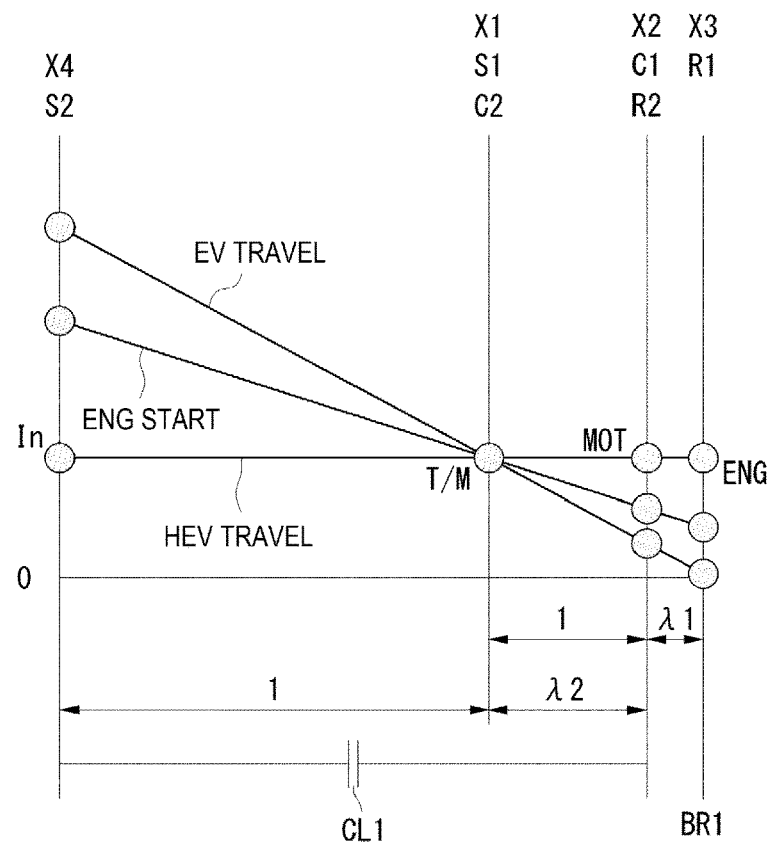

According to this configuration, when any two of the first through fourth rotary elements X1, X2, X3, X4 are engaged, the rotational speeds of the first through fourth rotary elements X1, X2, X3, X4 match. As a result, it is possible to make the HEV travel in a directly coupled state where the rotation of the engine 2, the rotation of the motor 3, and the rotation of the automatic transmission 4, which are coupled to the first through fourth rotary elements X1, X2, X3, X4, match. As in the first modified embodiment illustrated in FIG. 15B, when the clutch CL1 is engaged, the rotation of the inertial member In (the fourth rotary element X4) and the rotation of the ring gear R2 of the second gear set PG2 match, and the rotational speeds of the first through fourth rotary elements X1, X2, X3, X4 match due to such a characteristic that the rotary elements of the planetary gear mechanisms PG1, PG2 are aligned linearly on the speed chart. As a result, it is possible to make the HEV travel in the directly coupled state where the rotation of the engine 2, the rotation of the motor 3, and the rotation of the automatic transmission 4, which are coupled to the first through fourth rotary elements X1, X2, X3, X4, match.

In this embodiment, a configuration in which the power transmission system 105 includes the first gear set PG1 and the second gear set PG2 has been described. However, the power transmission system 105 may include any one of the first gear set PG1 and the second gear set PG2, may constitute the pinion gear, which is supported by the carrier of one of the first gear set PG1 and the second gear set PG2, by stepped pinion gears, and may include a ring gear that meshes with the stepped pinion gears.

Figure 16A:
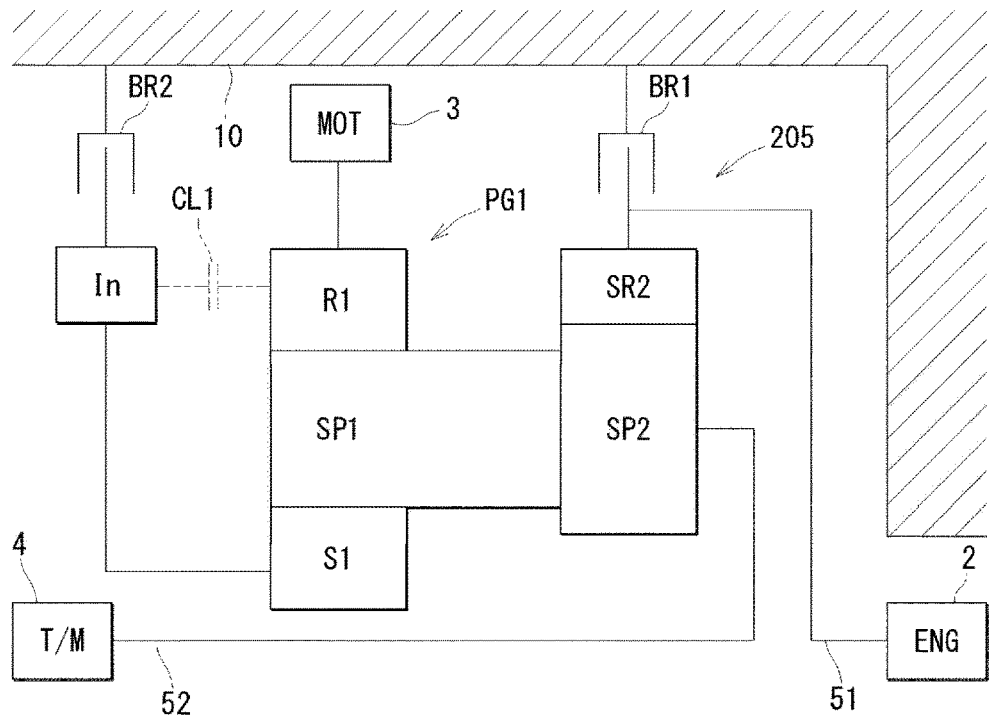
FIG. 16A is a schematic diagram and FIG. 16B is a speed chart of a power transmission system in a second modified embodiment.

As in the second modified embodiment illustrated in FIG. 16A, a power transmission system 205 includes the first gear set PG1, and the pinion gear that is joined to the carrier C1 of the first gear set PG1 includes stepped pinion gears. The stepped pinion gears are a first pinion SP1 and the second pinion SP2. The first pinion SP1 and the second pinion SP2 are integrally formed. The first pinion SP1 and the second pinion SP2 are formed to integrally rotate in the same direction.

The second pinion SP2 is arranged coaxially with the first pinion SP1, and is formed to have a larger diameter than the first pinion SP1. The second pinion SP2 has external teeth that mesh with a ring gear SR2. The first pinion SP1 is arranged coaxially with the second pinion SP2, and is formed to have a smaller diameter than the second pinion SP2. The first pinion SP1 constitutes a part of the first gear set PG1 or the second gear set PG2. The first pinion SP1 is arranged on the opposite drive source side of the second pinion SP2. Although FIG. 16A only illustrates the first pinion SP1 and the second pinion SP2 for description, the first pinion SP1 and the second pinion SP2 are supported by the first carrier SC1 and the second carrier SC2, respectively.

In the power transmission system 205, the planetary gear mechanisms PG1, SC2, SR2 have the first rotary element X1 including the first carrier SC1 and the second carrier SC2, the second rotary element X2 including the ring gear R1 of the first gear set PG1, the third rotary element X3 including the second ring gear SR2, and the fourth rotary element X4 including the sun gear S1 of the first gear set PG1.

The automatic transmission 4 is connected to the first rotary element X1 via the output shaft 52, the motor 3 is connected to the second rotary element X2, the engine 2 is connected to the third rotary element X3 via the first brake BR1 and the input shaft 51, and the second brake BR2 is connected to the fourth rotary element X4. In this way, the same operational effects as those in the embodiment can be obtained.

Figure 16B:
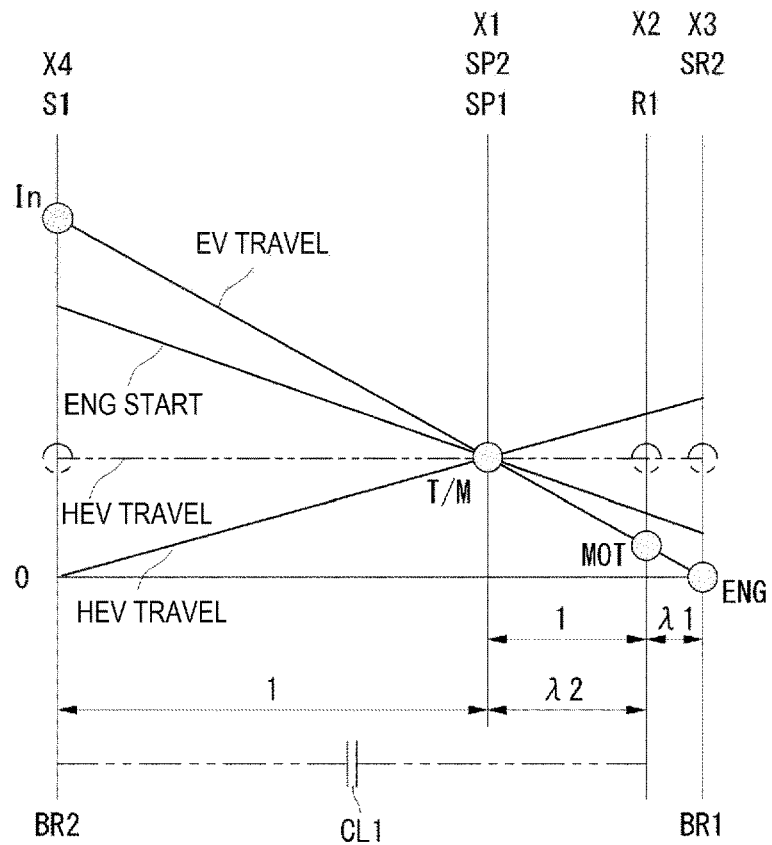

In addition, as indicated by an imaginary line in FIG. 16A, instead of the second brake BR2, the power transmission system 205 may include the clutch CL1 that is provided between the inertial member In and the ring gear R1 of the first gear set PG1 and engages and disengages the inertial member In with and from the ring gear R1. The clutch CL1 is not limited to one that engages and disengages the inertial member In with and from the ring gear R2, and may be one that synchronizes the rotation of any two of the first through fourth rotary elements. In this way, as indicated by a chart in FIG. 16B, when the clutch CL1 is engaged, the rotation of the inertial member In (the fourth rotary element X4) and the rotation of the ring gear R2 of the 2nd gear set PG2 match, and the rotational speeds of the first through fourth rotary elements Xl, X2, X3, X4 match due to such a characteristic that the rotary elements of the planetary gear mechanisms PG1, PG2 are aligned linearly on the speed chart. As a result, it is possible to make the HEV travel in the directly coupled state where the rotation of the internal combustion engine, the rotation of the electric motor, and the rotation of the transmission, which are coupled to the first through fourth rotary elements X1, X2, X3, X4, match.

INDUSTRIAL APPLICABILITY

As it has been described so far, the present disclosure provides the power transmission system for the hybrid vehicle that includes the planetary gear mechanism coupling the internal combustion engine, the electric motor, and the transmission. Since the power transmission system can suppress the transmission of the torque fluctuation of the internal combustion engine to the transmission side at the start of the internal combustion engine in the EV travel while suppressing the energy loss by the slip control during the start, the power transmission system can favorably be used in the vehicle, on which the power transmission system is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: hybrid vehicle
2: engine (internal combustion engine)
3: motor (electric motor)
4: automatic transmission (transmission)
5: power transmission system
10: transmission case (housing)
BR1: first brake (brake)
BR2: inertia brake (second brake)
C1: carrier
CL1: clutch
PG1: first planetary gear set
PG2: second planetary gear set
R1: ring gear
S1: sun gear
X1: first rotary element
X2: second rotary element
X3: third rotary element
X4: fourth rotary element

The invention claimed is:

1. A power transmission system for a hybrid vehicle including a planetary gear mechanism that couples an internal combustion engine, an electric motor, and a transmission in a manner to allow power transmission, the power transmission system for a hybrid vehicle comprising:
a brake that engages and disengages the internal combustion engine with and from a housing, wherein
the planetary gear mechanism has a first rotary element, a second rotary element, a third rotary element, and a fourth rotary element,
any one of the internal combustion engine, the electric motor, and the transmission is connected to a respective one of the first rotary element, the second rotary element, and the third rotary element,
the fourth rotary element is configured as an inertial member for suppressing transmission of a torque fluctuation of the internal combustion engine to the transmission side,
on a speed chart geometrically representing rotational speeds of the rotary elements, speed axes representing the rotary elements and extending vertically are aligned along a horizontal axis from one end toward another end at intervals corresponding to a gear tooth ratio of the planetary gear mechanism and are set as the first rotary element, the second rotary element, and the third rotary element in this order from the one end, and the rotary element that is arranged on the one side of the first rotary element or on the other side of the third rotary element is set as the fourth rotary element,
the planetary gear mechanism includes a first planetary gear set and a second planetary gear set each having three rotary elements,
two rotary elements of the three rotary elements constituting the first planetary gear mechanism are coupled to two rotary elements of the three rotary elements constituting the second planetary gear mechanism to constitute two of the first rotary element, the second rotary element, and the third rotary element,
the power transmission system is further configured to:
engage the brake during electric vehicle (EV) travel in which only the electric motor is used as a drive source; and
disengage the brake and thereby start the internal combustion engine at the time of switching from the EV travel to hybrid vehicle (HEV) travel in which the internal combustion engine and the electric motor are used as drive sources, and
the power transmission system further comprises an inertia brake that is engaged during the HEV travel and differs from the brake engaging and disengaging the fourth rotary element with and from the housing.

2. The power transmission system for a hybrid vehicle according to claim 1 further comprising:
a clutch that is engaged during the HEV travel and engages and disengages any two rotary elements of the first through fourth rotary elements.

3. The power transmission system for a hybrid vehicle according to claim 1, wherein
the first rotary element includes a sun gear of the planetary gear mechanism and is connected with the transmission,
the second rotary element includes a carrier of the planetary gear mechanism and is connected with the electric motor, and
the third rotary element includes a ring gear of the planetary gear mechanism and is connected with the internal combustion engine.

4. The power transmission system for a hybrid vehicle according to claim 3, wherein
an inertial mass of the inertial member is set based on:
an electric motor inertial mass being the inertial mass of the electric motor;
a first gear ratio being a ratio of a number of teeth of the rotary element which is connected to the internal combustion engine, to a number of teeth of the rotary element which is connected to the transmission, of the first through third rotary elements; and
a second gear ratio as a ratio of a number of teeth of the rotary element which is connected to the electric motor, of the first through third rotary elements, to a rotational speed of the fourth rotary element.

5. The power transmission system for a hybrid vehicle according to claim 4, wherein
the inertial mass of the inertial member and the second gear ratio are set to be balanced with a relationship between the electric motor inertial mass and the first gear ratio.

6. The power transmission system for a hybrid vehicle according to claim 5, wherein
when the electric motor inertial mass is set as Im, the inertial mass of the inertial member is set as Ii, the first gear ratio is set as $\lambda 1$, and the second gear ratio is set as $\lambda 2$, the following formula is satisfied:

$$\lambda 1 \cdot Im = 1/\lambda 2 (1/\lambda 2 - (1+\lambda 1)) \cdot Ii.$$

7. The power transmission system for a hybrid vehicle according to claim 5, wherein
when the electric motor inertial mass is set as Im, the inertial mass of the inertial member is set as Ii, the first gear ratio is set as $\lambda 1$, and the second gear ratio is set as $\lambda 2$, the following formula is satisfied:

$$\lambda 1 \cdot Im = 1/\lambda 2 (1/\lambda 2 - (1+\lambda 1)) \cdot Ii.$$

8. The power transmission system for a hybrid vehicle according to claim 1, wherein
an inertial mass of the inertial member is set based on:
an electric motor inertial mass being the inertial mass of the electric motor;
a first gear ratio being a ratio of a number of teeth of the rotary element which is connected to the internal combustion engine, to a number of teeth of the rotary element which is connected to the transmission, of the first through third rotary elements; and
a second gear ratio being a ratio of a number of teeth of the rotary element which is connected to the electric motor, of the first through third rotary elements, to a rotational speed of the fourth rotary element.

9. A power transmission system for a hybrid vehicle including a planetary gear mechanism that couples an internal combustion engine, an electric motor, and a transmission in a manner to allow power transmission, the power transmission system for a hybrid vehicle comprising:
a brake that engages and disengages the internal combustion engine with and from a housing, wherein
the planetary gear mechanism has a first rotary element, a second rotary element, a third rotary element, and a fourth rotary element,
any one of the internal combustion engine, the electric motor, and the transmission is connected to a respective one of the first rotary element, the second rotary element, and the third rotary element,
the fourth rotary element is configured as an inertial member for suppressing transmission of a torque fluctuation of the internal combustion engine to the transmission side,
the first rotary element includes a sun gear of the planetary gear mechanism and is connected with the transmission,
the second rotary element includes a carrier of the planetary gear mechanism and is connected with the electric motor, and
the third rotary element includes a ring gear of the planetary gear mechanism and is connected with the internal combustion engine.

10. A power transmission system for a hybrid vehicle including a planetary gear mechanism that couples an internal combustion engine, an electric motor, and a transmission in a manner to allow power transmission, the power transmission system for a hybrid vehicle comprising:
a brake that engages and disengages the internal combustion engine with and from a housing, wherein
the planetary gear mechanism has a first rotary element, a second rotary element, a third rotary element, and a fourth rotary element,
any one of the internal combustion engine, the electric motor, and the transmission is connected to a respective one of the first rotary element, the second rotary element, and the third rotary element,
the fourth rotary element is configured as an inertial member for suppressing transmission of a torque fluctuation of the internal combustion engine to the transmission side, and
an inertial mass of the inertial member is set based on:
an electric motor inertial mass being the inertial mass of the electric motor;
a first gear ratio being a ratio of a number of teeth of the rotary element which is connected to the internal combustion engine, to a number of teeth of the rotary element which is connected to the transmission, of the first through third rotary elements; and
a second gear ratio being a ratio of a number of teeth of the rotary element which is connected to the electric motor, of the first through third rotary elements, to a rotational speed of the fourth rotary element.

* * * * *